US012807077B2

(12) United States Patent
Weinert et al.

(10) Patent No.: US 12,807,077 B2
(45) Date of Patent: Nov. 24, 2026

(54) MODULAR HITCH-MOUNTED EQUIPMENT CARRIER SYSTEM

(71) Applicant: Saris Equipment, LLC, Edison, NJ (US)

(72) Inventors: James Weinert, Madison, WI (US); Erik Eagleman, Madison, WI (US); Kellen Pagel, Madison, WI (US); Jeffery Iverson, Madison, WI (US)

(73) Assignee: SARIS EQUIPMENT, LLC, Edison, NJ (US)

(*) Notice: Subject to any disclaimer, the term of this patent is extended or adjusted under 35 U.S.C. 154(b) by 117 days.

(21) Appl. No.: 18/711,489

(22) PCT Filed: Nov. 17, 2022

(86) PCT No.: PCT/US2022/080080
§ 371 (c)(1),
(2) Date: May 17, 2024

(87) PCT Pub. No.: WO2023/092035
PCT Pub. Date: May 25, 2023

(65) Prior Publication Data

US 2025/0018873 A1 Jan. 16, 2025

Related U.S. Application Data

(60) Provisional application No. 63/280,411, filed on Nov. 17, 2021.

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC ....... B60R 9/06; B60R 9/10; B60R 2011/008; B60R 2011/0082; B60R 9/045;
(Continued)

(56) References Cited

U.S. PATENT DOCUMENTS 4,524,893 A * 6/1985 Cole .......................... B60R 9/10 211/5
5,219,105 A 6/1993 Kravitz
(Continued)

OTHER PUBLICATIONS

International Preliminary Report on Patentability for corresponding International Patent Application No. PCT/US22/80080 dated May 2, 2024. 10 pages.
(Continued)

*Primary Examiner* — Adam J Waggenspack
(74) *Attorney, Agent, or Firm* — Leason Ellis LLP

(57) ABSTRACT

A hitch-mounted carrier system is provided. The system includes a single support member that can engage with a hitch receiver of a vehicle, and a carrier component that can carry at least one item. The single support member includes a hitch mounting section having a mounting bar that can be received within a passage defined by the hitch receiver of the vehicle, and a beam pivotably mounted to the hitch mounting section, where the beam includes at least one mounting area. The single support member further includes a handle secured to the rear end of beam, where the handle can be grasped for moving the beam between multiple positions, and a bumper connected to the beam that maintains the rear end of beam above a ground surface when the beam is tilted. The carrier component is attached to the beam at the at least one mounting area.

20 Claims, 27 Drawing Sheets

(58) Field of Classification Search
CPC ....... B60R 2011/004; B60R 2011/0085; Y10S 224/924
USPC ................................ 224/488, 519–521, 924
See application file for complete search history.

(56) References Cited

U.S. PATENT DOCUMENTS

| | | | | |
|---|---|---|---|---|
| 5,377,886 | A * | 1/1995 | Sickler | B60R 9/10 224/558 |
| 5,460,304 | A | 10/1995 | Porter et al. | |
| 5,624,063 | A * | 4/1997 | Ireland | B60R 9/045 224/924 |
| 5,820,004 | A | 10/1998 | Lane | |
| 5,836,493 | A | 11/1998 | Grunsted et al. | |
| 6,095,387 | A | 8/2000 | Lipscomb | |
| 6,244,483 | B1 | 6/2001 | McLemore et al. | |
| 6,283,349 | B1 * | 9/2001 | Morris | B60R 9/048 224/558 |
| 6,491,195 | B1 | 12/2002 | McLemore et al. | |
| 7,815,083 | B2 * | 10/2010 | Clausen | B60R 9/06 224/521 |
| 9,073,492 | B1 * | 7/2015 | Shen | B60R 9/10 |
| 10,384,618 | B2 | 8/2019 | Williams | |
| 10,399,506 | B2 | 9/2019 | Anderson et al. | |
| 10,857,949 | B2 * | 12/2020 | Lesley | B60R 9/10 |
| 11,091,099 | B1 * | 8/2021 | Shen | B60R 9/06 |
| 11,148,607 | B1 * | 10/2021 | Hsieh | B60R 9/045 |
| 11,155,217 | B2 | 10/2021 | Prescott et al. | |
| 11,208,167 | B2 * | 12/2021 | Kuschmeader | B60R 9/06 |
| 11,390,222 | B2 | 7/2022 | Prescott et al. | |
| 11,472,502 | B1 * | 10/2022 | Huang | B60R 9/06 |
| 11,628,777 | B2 * | 4/2023 | Huang | B60R 9/06 224/569 |
| 2008/0099522 | A1 | 5/2008 | Clausen et al. | |
| 2016/0068111 | A1 * | 3/2016 | Walker | B60R 9/10 224/521 |
| 2020/0023787 | A1 * | 1/2020 | Prescott | B60R 9/06 |
| 2020/0156724 | A1 * | 5/2020 | Kuschmeader | B60R 9/06 |
| 2020/0406825 | A1 * | 12/2020 | Wang | B60R 9/048 |
| 2021/0170955 | A1 * | 6/2021 | Nusbaum | B60R 9/06 |
| 2022/0219614 | A1 | 7/2022 | Prescott et al. | |

OTHER PUBLICATIONS

International Search Report and Written Opinion for corresponding International Patent Application No. PCT/US22/80080 dated Feb. 21, 2023. 18 pages.

* cited by examiner

MODULAR HITCH-MOUNTED EQUIPMENT CARRIER SYSTEM

CROSS-REFERENCE TO RELATED APPLICATIONS

This application is a U.S. National Stage Application under 35 U.S.C. § 371 of International Patent Application No. PCT/US22/80080 filed Nov. 17, 2022, which claims the benefit of priority of U.S. provisional patent application Ser. No. 63/280,411, filed Nov. 17, 2021, all of which are which is hereby incorporated by reference in their entireties. The International Application was published on May 25, 2023, as International Publication No. WO 2023/092035.

FIELD

The present invention relates to carrier systems for mounting on vehicles and, more particularly, to carrier systems for carrying equipment.

BACKGROUND

Systems for carrying and transporting equipment (e.g., bicycles, camping equipment) on vehicles are vital for those who enjoy the outdoors. Typically, carrier systems have been designed for carrying a certain type of equipment or a certain number of items. As such, conventionally, users have had to use different carrier systems for carrying different types of equipment.

SUMMARY

In first aspect, a hitch-mounted carrier system is provided. The system includes a single support member that is configured for engagement with a hitch receiver of a vehicle. The single support member comprises a hitch mounting section that includes a hitch mounting bar configured at a first end to be received within a passage defined by the hitch receiver of the vehicle, and a beam pivotably mounted to the hitch mounting section, where the beam includes at least one mounting area. The single support member also comprises a handle secured to the rear end of beam, where the handle is configured to be grasped by a user for moving the beam between multiple positions, and a bumper secured to the beam, where the bumper maintains the rear end of beam above a ground surface when the beam is tilted. The system also includes a carrier component configured to carry at least one item, where the carrier component is attached to the beam at the at least one mounting area.

In another aspect, the hitch mounting section includes a bracket assembly secured to the hitch mounting bar rearwardly of the first end of the hitch mounting bar, the beam includes a front mounting section at a forward end of beam and a rear mounting section at a rear end of beam, the at least one mounting area is provided between the front mounting section and the rear mounting section, and at a forward end of the front mounting section, the beam is engaged with the bracket assembly, which defines a pivot axis about which the beam is pivotable relative to the hitch mounting section.

In a further aspect, the bracket assembly includes a pair of notched side bracket members, and the beam is positioned between the side bracket members and engaged with the bracket assembly via a transverse through-bolt.

In another aspect, the multiple positions of the beam include a lowered tilt position, an operative position, and inoperative, folded positions.

In another aspect, the hitch-mounted carrier system further comprises at least one mounting clasp, the mounting clasp being removably attached to the mounting area and configured for secure attachment of the carrier component to the beam.

In a further aspect, the mounting clasp comprises an upper section and a lower section, which are pivotably interconnected at a hinge via a pivot pin for movement between an open position and a closed position.

In another aspect, the rear mounting area includes an additional space at which a second carrier component is mounted.

In another aspect, the handle includes an actuator member, an actuator rod, and a retainer bar, wherein the actuator member is secured to the rear end of the actuator rod, which extends longitudinally through the interior of beam and is connected at its forward end to the retainer bar, and wherein the retainer bar extends through a pair of slots in side walls of the front mounting section and aligned slots in sidewalls of the beam.

In a further aspect, end portions of retainer bar extend outwardly from the side walls of the beam and the front mounting section and are configured to be received within the notches defined by the side bracket members.

In another aspect, the carrier component is a single-arm bicycle carrier module comprising a tray, wherein the tray is configured to underlie both wheels of a bicycle and is engaged with one of the mounting areas via the mounting clasp.

In a further aspect, the tray includes, on a first end, a ratchet strap assembly that is configured for wrapping about a lower area of the bicycle wheels for maintaining them in position, and on a second end, an arcuate wheel engagement member and a wheel clamp assembly that includes a pivoting arm and a hook assembly, wherein the wheel of the bicycle is clamped between the hook assembly and the wheel engagement member.

In a second aspect, a hitch-mounted carrier system is provided. The system includes a single support member configured for engagement with a hitch receiver of a vehicle. The single support member comprises a hitch mounting section that includes a hitch mounting bar configured at a first end to be received within a passage defined by the hitch receiver of the vehicle and a beam pivotably mounted to the hitch mounting section, wherein the beam includes at least two mounting areas. The single support member also includes a handle secured to the rear end of beam, where the handle is configured to be grasped by a user for moving the beam between multiple positions, and a bumper secured to the beam, where the bumper is configured to maintains the rear end of beam above a ground surface when the beam is tilted. The system also includes a carrier component configured to carry at least one item, wherein the carrier component is attached to the beam the at least one mounting area.

In another aspect, the bumper comprises a light-emitting component, wherein upon activation the lighting module selectively emits light via the light-emitting component.

In another aspect, the hitch mounting section includes a bracket assembly secured to the hitch mounting bar rearwardly of the first end of the hitch mounting bar, wherein the beam includes a front mounting section, and wherein at a forward end of the front mounting section, the beam is engaged with the bracket assembly, which defines a pivot axis about which the beam is pivotable relative to hitch mounting section.

In another aspect, wherein the multiple positions of the beam include a lowered tilt position, an operative position, and inoperative, folded positions.

In another aspect, the hitch-mounted carrier system further comprises at least one mounting clasp, wherein the mounting clasp is removably attached to the mounting area and configured secure attachment of the carrier component to the beam.

In a further aspect, the mounting clasp comprises includes an upper section and a lower section, which are pivotably interconnected at a hinge via a pivot pin for movement between an open position and a closed position.

In a further aspect, the carrier component is a single-arm bicycle carrier module comprising a tray, wherein the tray is configured to underlie both wheels of a bicycle and is engaged with one of the mounting areas via the mounting clasp.

In another aspect, the carrier component is a double-arm bicycle carrier module comprising a tray, a pair of clamping arms pivotably mounted at respective ends of the tray, wherein the tray is configured to underlie both wheels of a bicycle and is securable to the beam via the mounting clasp, and the clamping arms are configured to selectively pivot between an upright clamping position and a folded position.

In another aspect, the carrier component is a frame-engaging bicycle carrier module comprising at least one tray, wherein the at least one tray is configured to underlie the bicycle wheels and is securable to the beam via the mounting clasp; a support frame assembly comprising a base mounted to a front mounting section of the beam and a support frame pivotably mounted to the base, wherein an upper end of the support frame includes at least one pivotably mounted support arm, wherein the support arm is configured to selectively engage a frame portion of the bicycle.

DETAILED DESCRIPTION

The present application relates to an equipment carrier for mounting to the hitch receiver of a vehicle, and more particularly to a hitch-mounted equipment carrier with a modular construction for carrying various equipment supports or items of equipment on a vehicle.

The modular hitch-mounted equipment carrier system of the present application generally includes a mounting base that can be a single support member that is configured for engagement with the hitch receiver of a vehicle, in combination with one or more components that can be secured to the mounting base by a user. The components may include a series of differently configured bicycle supports, as well as a number of different carriers or other items of equipment.

Figure 1A:
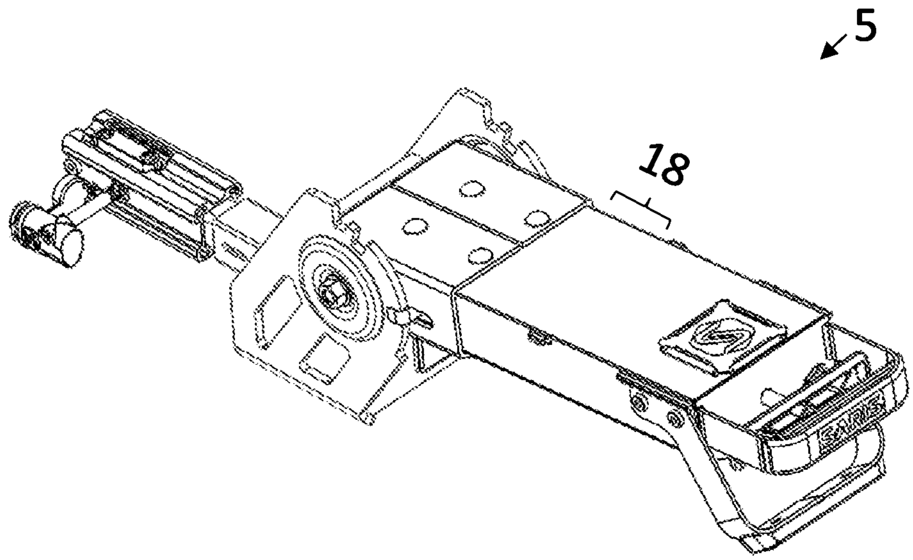
FIGS. 1A-1C display exemplary mounting bases of various sizes in accordance with one or more embodiments.
Figure 1B:
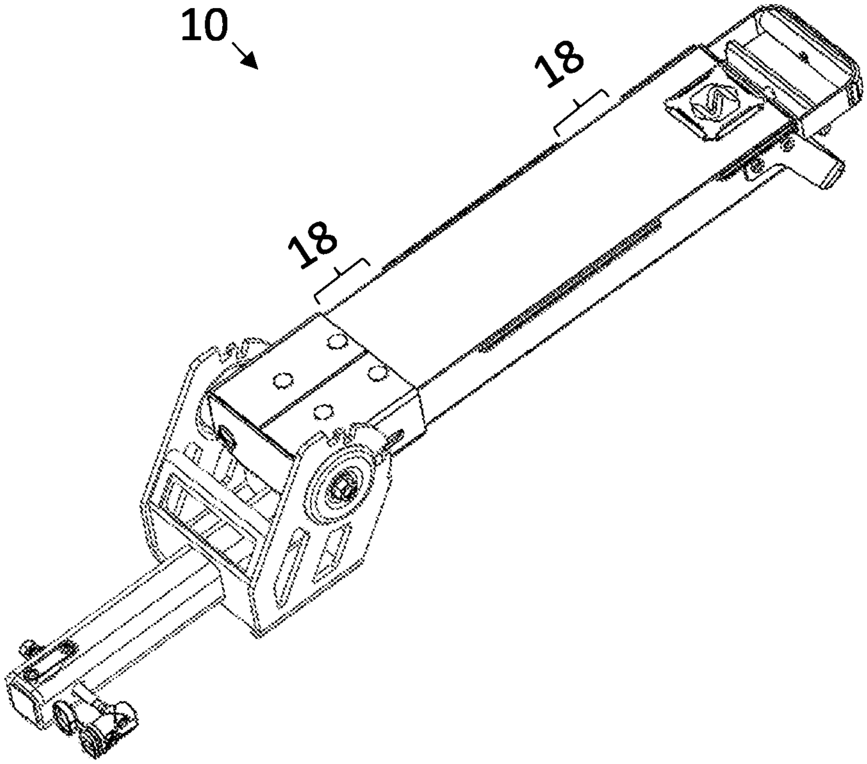
Figure 1C:
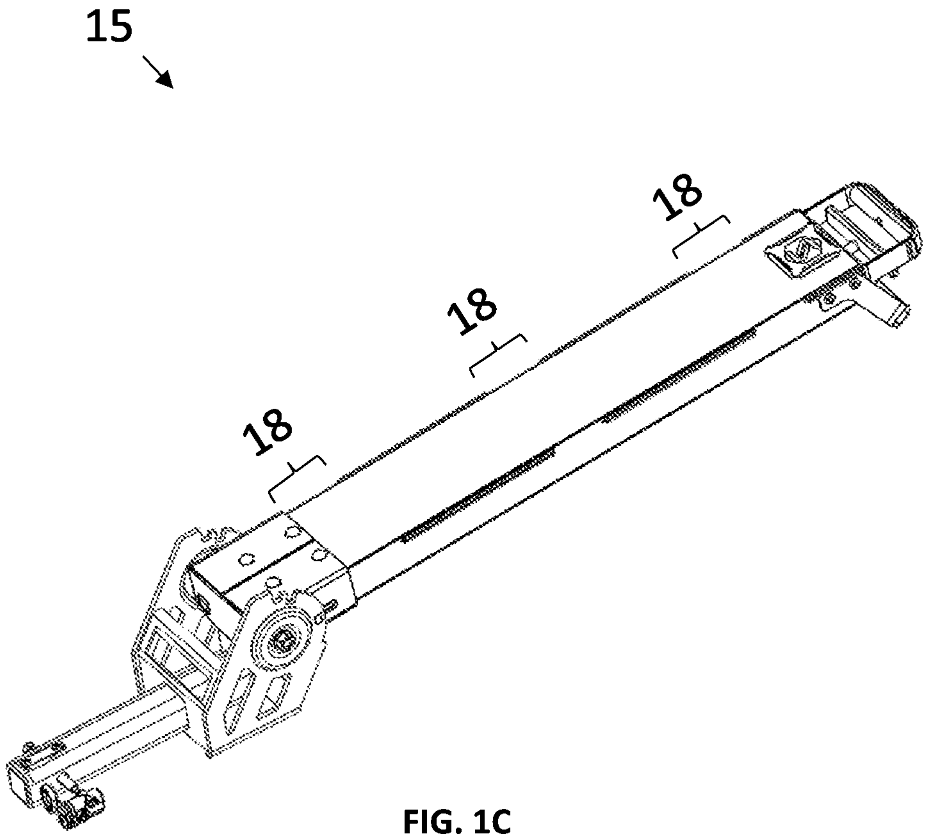

The foundation of the modular hitch-mounted equipment carrier system is a mounting base, which itself may have different capabilities as desired by the user. FIGS. 1A-1C display exemplary mounting bases of various sizes in accordance with one or more embodiments. The mounting base may, for example, be a small mounting base such as mounting base 5 (FIG. 1A), a medium mounting base such as mounting based 10 (FIG. 1B), or a large mounting base such as mounting base 15 (FIG. 1C). As the size of the mounting base increases, the number of components or items of equipment that can be mounted to it also increases. For example, in one or more embodiments, the small mounting base 5 can include one or more mounting areas 18 for attachment of an item or component, the medium mounting base 10 can include two or more mounting areas 18, and the large mounting based 15 can include three or more mounting areas 18.

Figure 2:
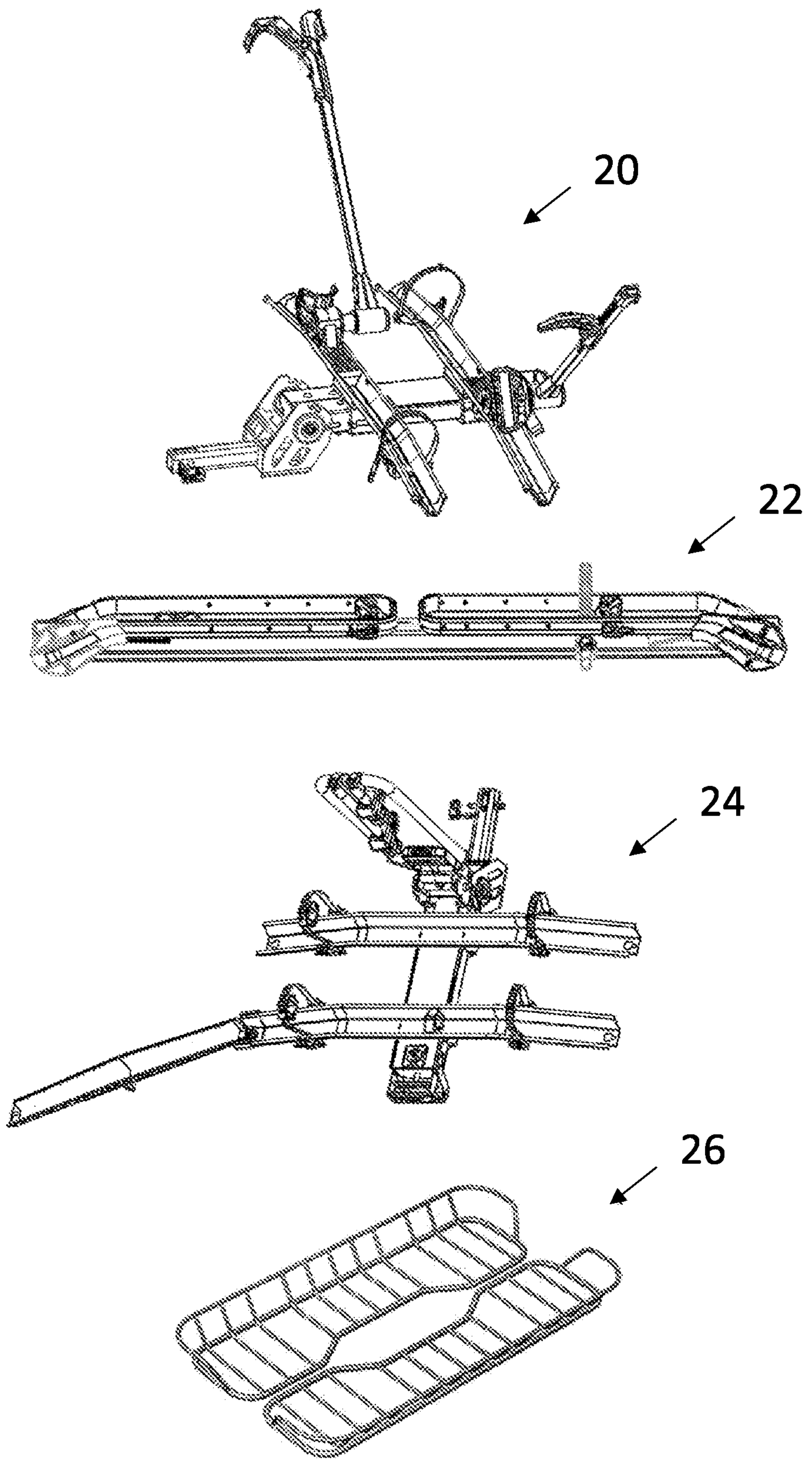
FIG. 2 displays exemplary carrier components or items of equipment that can be mounted to the mounting bases in accordance with one or more embodiments.

FIG. 2 displays exemplary carrier components or items of equipment that can be mounted to the mounting bases via the mounting area(s) 18 in accordance with one or more embodiments. The carrier components or items of equipment that may be mounted to any of the bases (5, 10, or 15) may include, for example, a single-arm bicycle carrier module 20, a double-arm bicycle carrier module 22, a frame-engaging bicycle support system 24, and an open cargo carrier 26. In at least one embodiment, other items of equipment can also be mounted to the base, such as a secure cargo carrier, a kitchen module, and a tent module (not shown). It is understood that the listed carrier components or items of equipment are representative of any number of different types of carriers or equipment that may be supported on any of the mounting bases 5, 10, and 15, and that in certain embodiments, other types of carrier, support or equipment as desired may be configured to be engaged with any of the bases.

FIGS. 3A-3F display various aspects of an exemplary mounting base 15 in accordance with one or more embodiments. It should be understood that the general components and construction of mounting bases 5 and 10 are generally the same as that shown and described with respect to base 15 in FIGS. 3A-3F, with the exception that in the illustrated embodiments, as mentioned above, base 15 provides three or more mounting areas 18, whereas bases 10 provides two or more mounting areas and base 5 provides one or more mounting areas. Thus, in one or more embodiments, the mounting base includes at least one mounting area. In at least one embodiment, the mounting base can have more than three mounting areas.

Figure 3A:
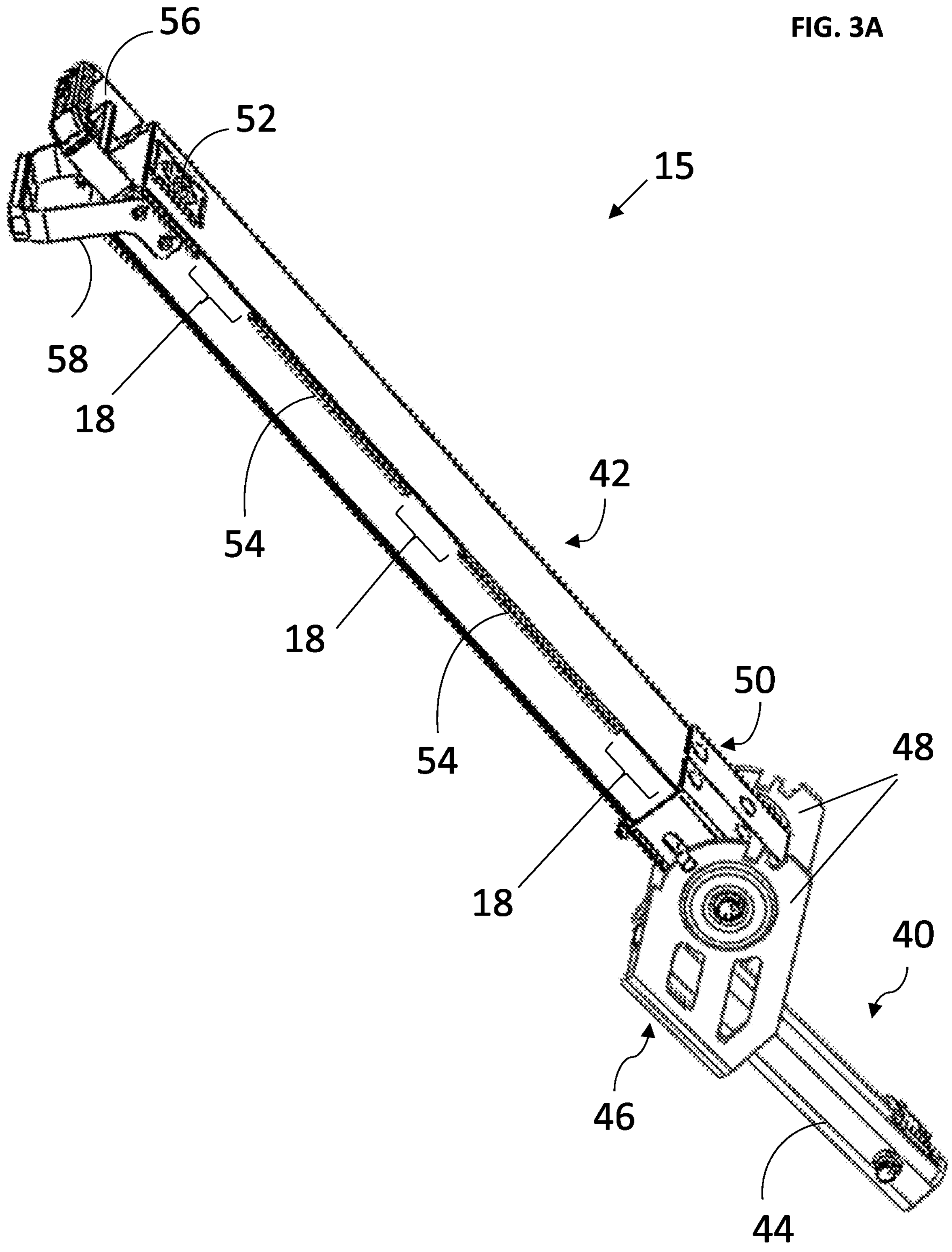
FIGS. 3A-3F display various aspects of an exemplary mounting base in accordance with one or more embodiments.
Figure 3B:
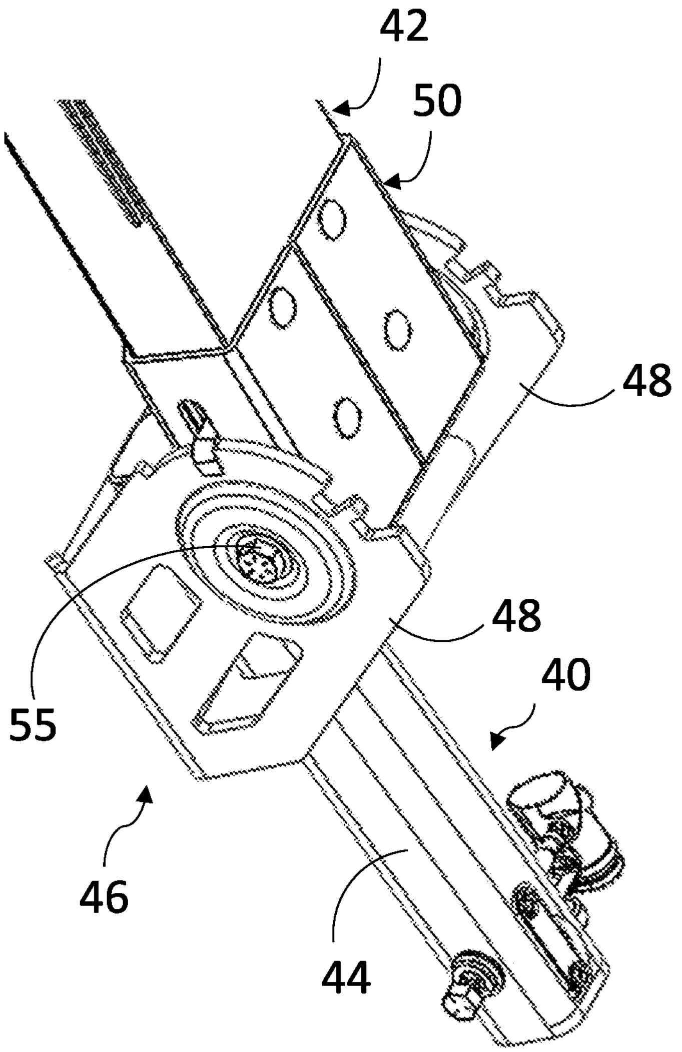
Figure 3C:
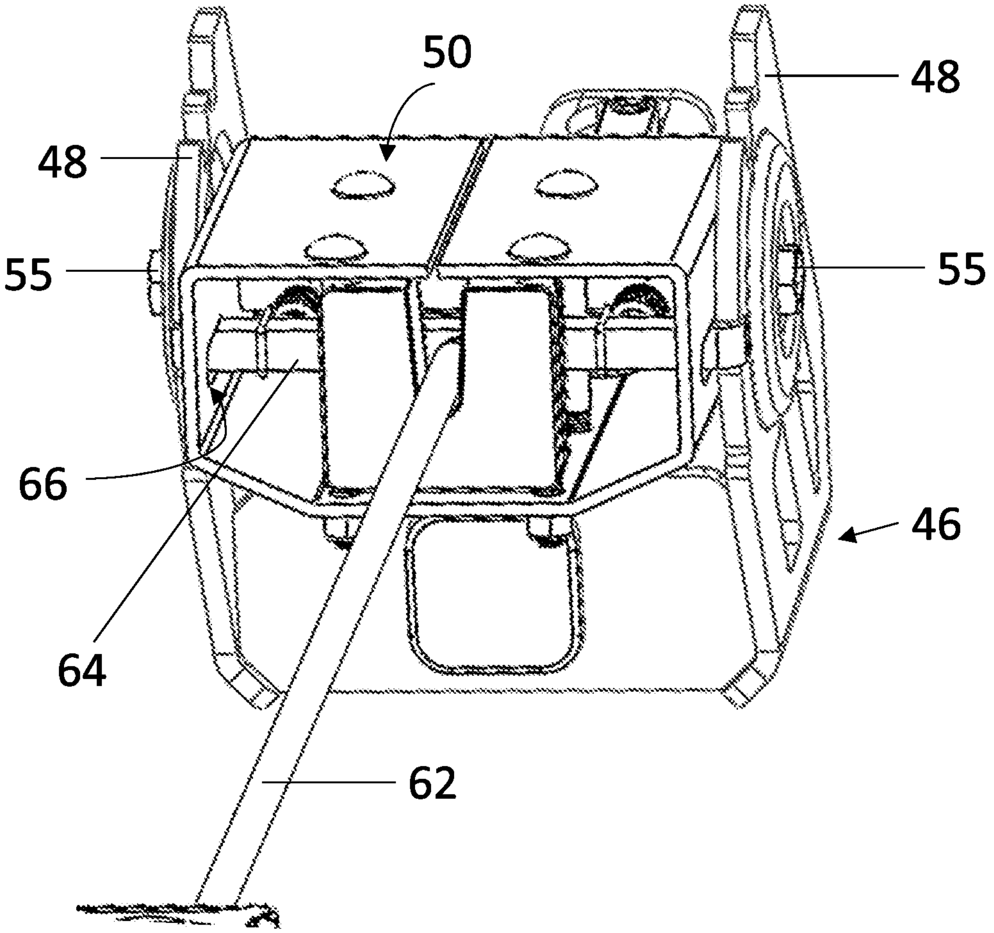
Figure 3D:
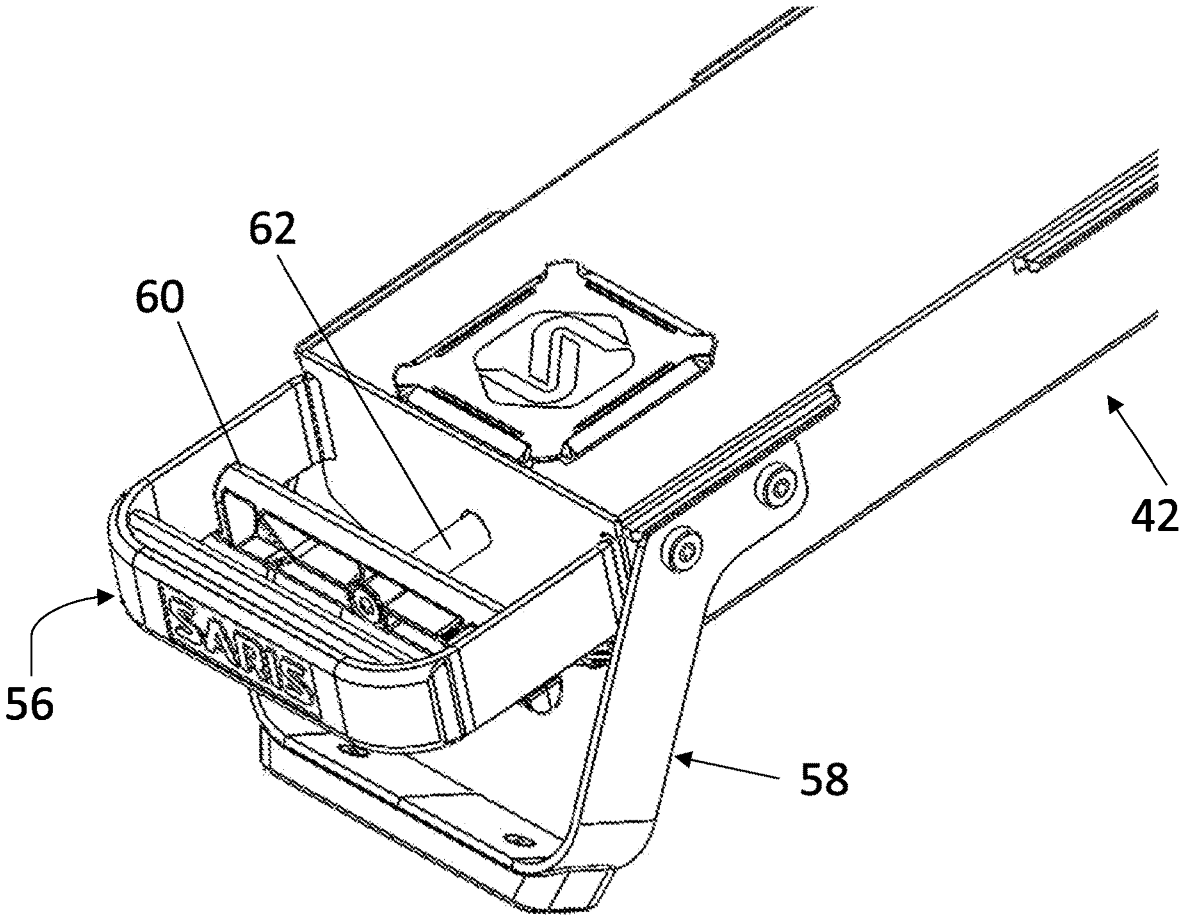
Figure 3E:
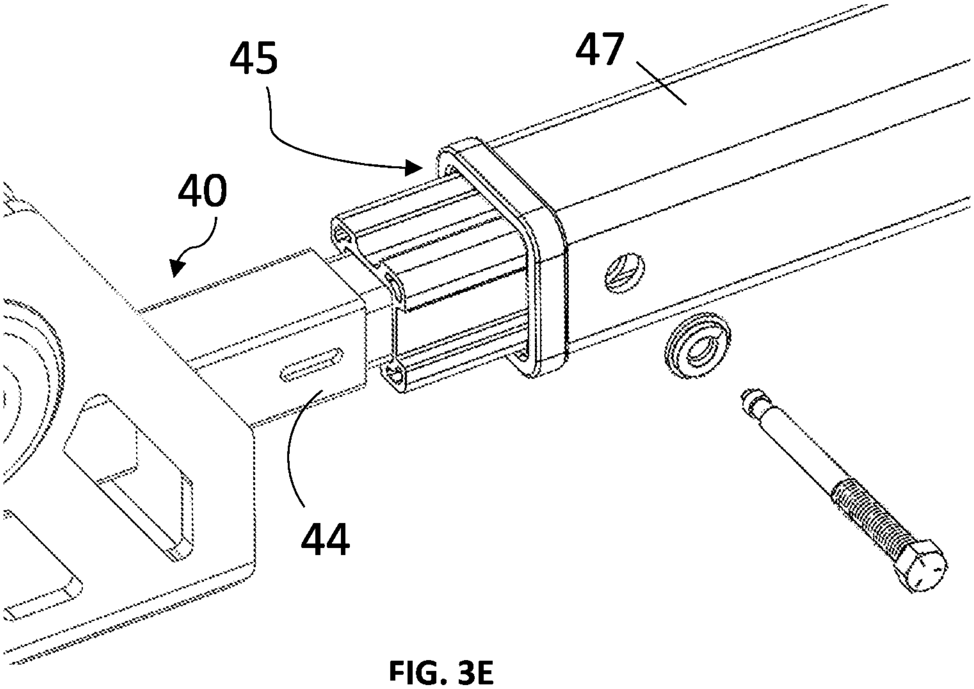
Figure 3F:
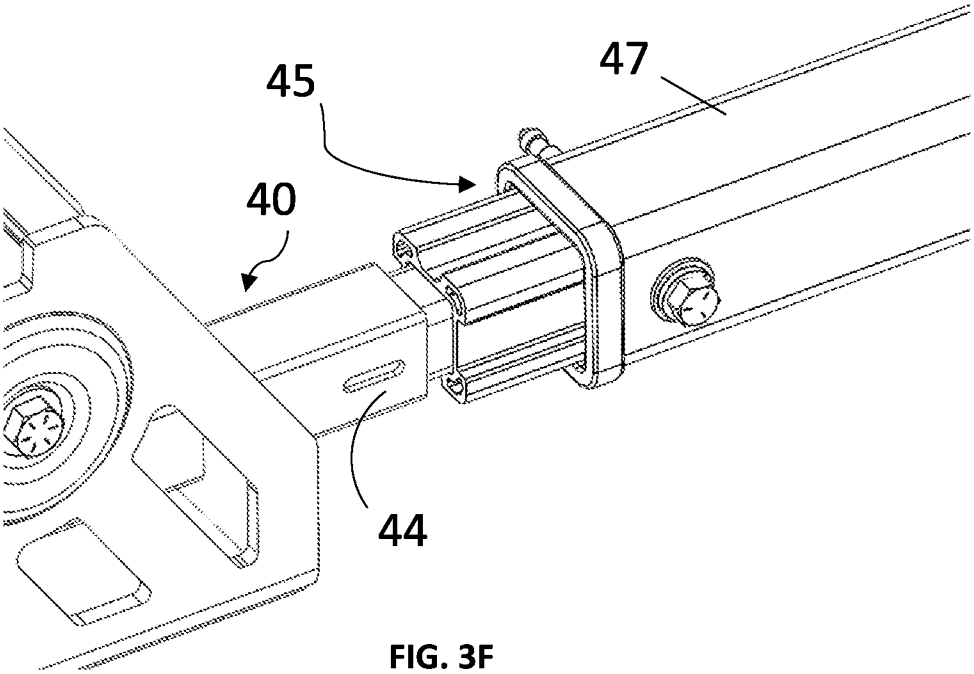

With reference now to FIGS. 3A-3F, in accordance with one or more embodiments, base 15 generally includes a hitch mounting section 40 and a beam 42 that is pivotably mounted to hitch mounting section 40. As shown in FIGS. 3E-3F, the hitch mounting section 40 can include a hitch mounting bar 44 that is configured at its forward end to be received within the passage 45 defined by a vehicle-mounted trailer hitch 47, in a manner as is known. As shown in FIGS.

3A-3B, a bracket assembly 46 can be secured to the hitch mounting bar 44 rearwardly of the area of hitch mounting bar that is adapted to be received within the hitch receiver. The bracket assembly 46 can include a pair of notched side bracket members 48.

In one or more embodiments, the beam 42 has a generally rectangular box-type cross-section, including a top wall, a bottom wall and a pair of side walls. A front reinforced mounting section 50 can be provided at the forward end of beam 42, and a rear mounting area 52 can be provided at the rearward end of beam 42. Between its front and rear ends, the beam 42 defines a series of mounting areas shown at 18. In one or more embodiments, the mounting areas 18 are defined by interruptions in a pair of lips 54 that extend outwardly from the corners defined by the top wall and the sidewalls of beam 42. Representatively, the lips 54 may be extensions of the beam top wall, although it is understood that any other satisfactory structure may be employed. The various carrier components or items of equipment are adapted for engagement with the beam 42 at one or more of the mounting areas 18.

At its front end, the beam 42 is positioned between the side bracket members 48 and is engaged with the bracket assembly 46 via a transverse through-bolt 55, which defines a pivot axis about which beam 42 is pivotable relative to bracket assembly 46 in accordance with one or more embodiments.

In at least one embodiment, a handle 56 is secured to the rear end of beam 42 and a bumper 58 is secure to the beam 42. The handle 56 is adapted to be grasped by a user for moving beam 42 between its various positions, in a manner to be explained. The bumper 58 provides protection for rear end of beam 42 during transport, and also maintains the rear end of beam 42 above the ground when beam 42 is tilted, also in a manner to be explained. In one or more embodiments, the bumper 58 may include a resilient resting member or pad at its lower end.

As exemplified in FIGS. 3C-3D, in one or more embodiments, an actuator member 60 extends transversely across an open interior space defined by the handle 56. FIG. 3C shows a back perspective view of the front end of the mounting base, showing the inner portions of the front reinforced mounting section 50 and the beam 42. FIG. 3D shows a back perspective view of the back end of the mounting base. Actuator member 60 can be secured to the rear end of an actuator rod 62, which extends longitudinally through the interior of beam 42 and is connected at its forward end to a transversely extending retainer bar 64. The retainer bar 64 extends through a pair of slots 66 in the side walls of front reinforced mounting section 50 and aligned slots in the sidewalls of beam 42. The end portions of retainer bar 64 thus extend outwardly from the sides of beam 42 and front reinforced mounting section 50, and are configured to be received within notches defined by the side bracket members 48.

Figure 3G:
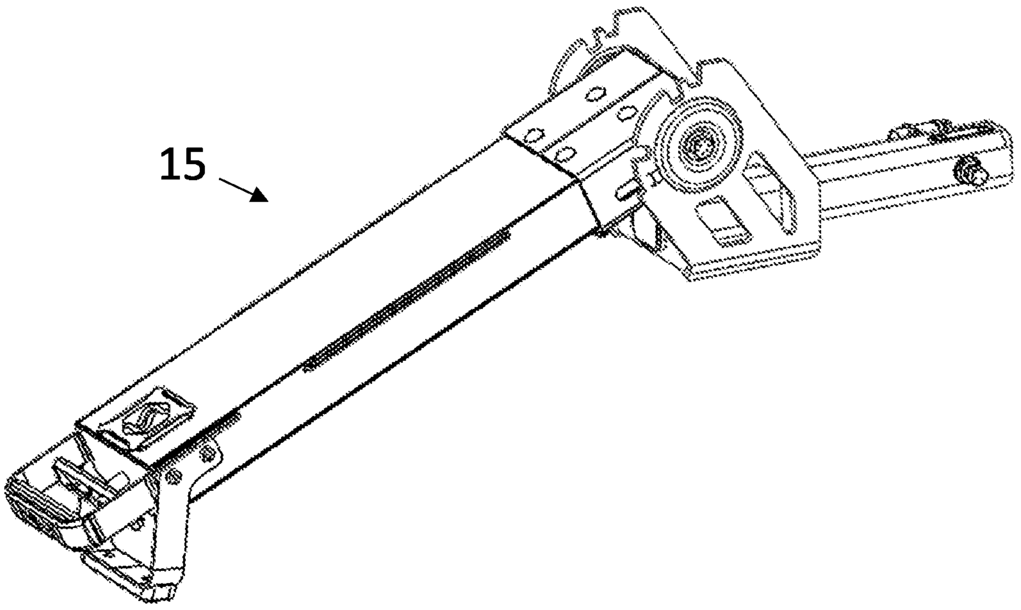
FIGS. 3G-3J displays the various positions of the exemplary mounting base in accordance with one or more embodiments.
Figure 3H:
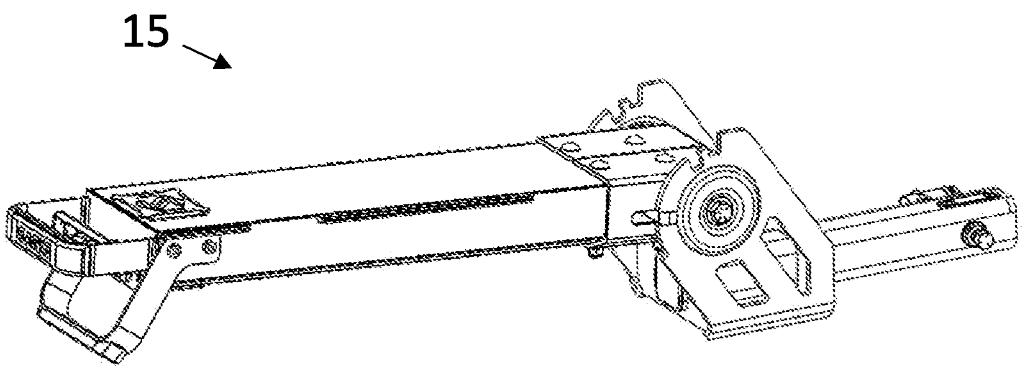
Figure 3I:
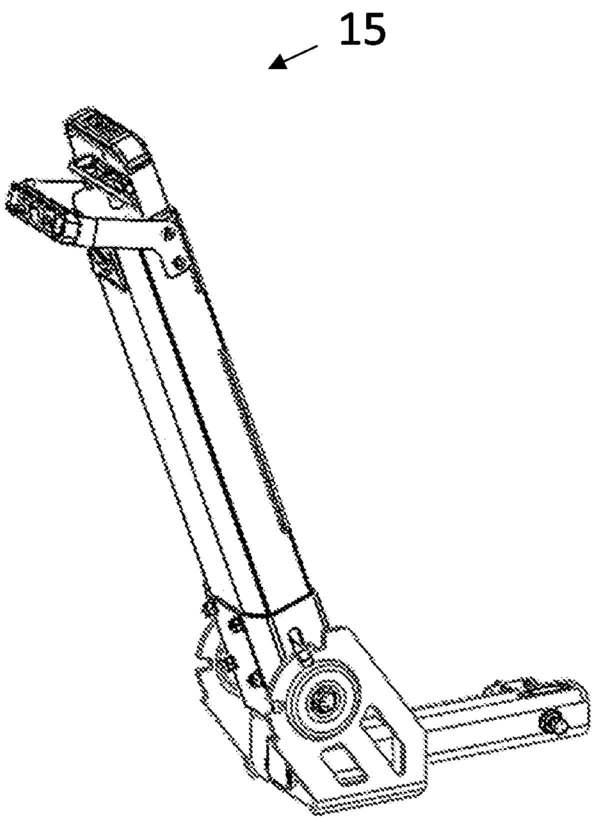
Figure 3J:
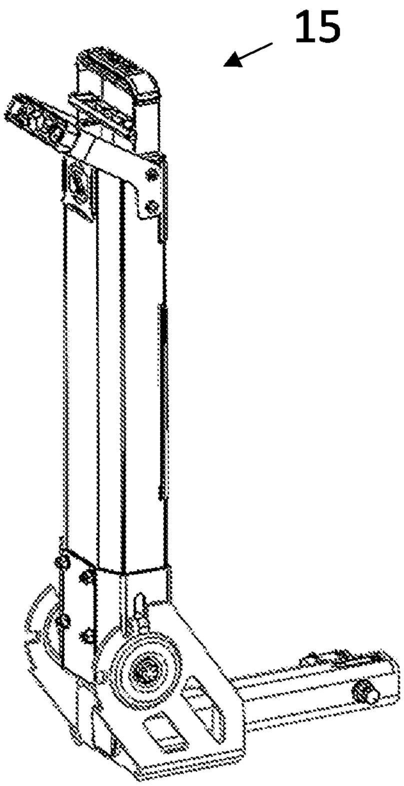

In accordance with one or more embodiments including the exemplified embodiment of FIG. 3D, in operation, the user applies a rearward force on actuator member 60 so as to withdraw the retainer bar 64 from the side bracket member notch within which it is engaged. The user can then pivot beam 42 between its various positions. Such positions may include, for example a lowered tilt position (FIG. 3G) dictated by engagement of the ends of retainer bar 64 with a lower shoulder defined by the side bracket members 48, an operative position (FIG. 3H) in which the ends of the retainer bar 64 are engaged within notches in side bracket members 48 that function to place beam 42 in a generally horizontal orientation, and inoperative, folded positions as shown in FIGS. 31 and 3J, in which the ends of the retainer bar 64 are engaged within one of two sets of upper notches in the side bracket members 48, such that the beam is in an upper tilted position (FIG. 3I) or a fully upright position (FIG. 3J). The upper tilted inoperative position as exemplified in FIG. 3I can, for example, can be useful for vehicles with low clearance to the bumper/rear of the vehicle. To move the beam between the various positions, one or more springs, or any other satisfactory biasing arrangement, may be engaged with the retainer bar 64 for biasing the retainer bar 64 forwardly in a direction tending to force the retainer bar end portions 64 into the notches in side bracket members 48.

Figure 4A:
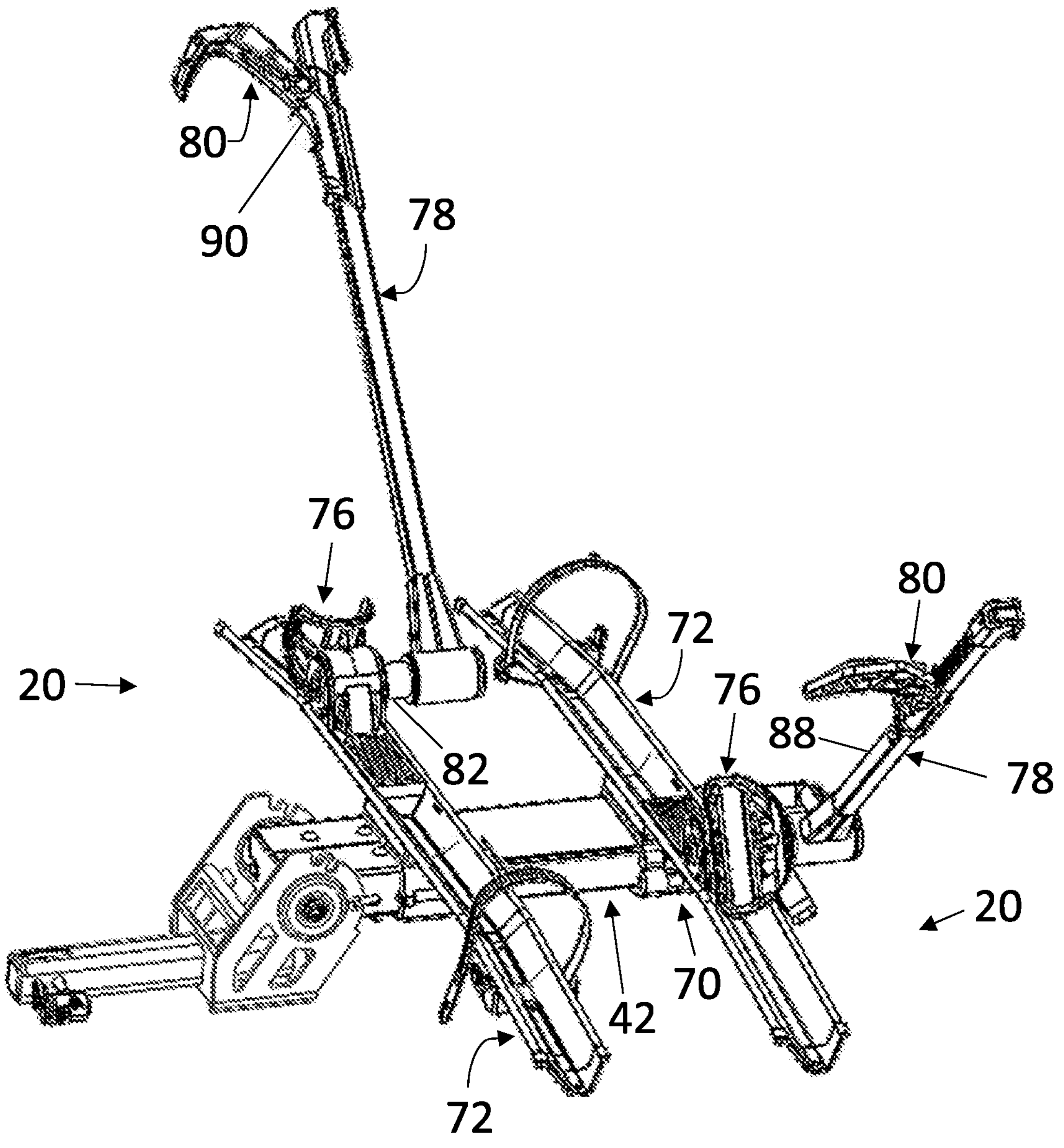
FIGS. 4A-4C display an exemplary single-arm bicycle carrier module and its attachment to a mounting base in accordance with one or more embodiments.
Figure 4B:
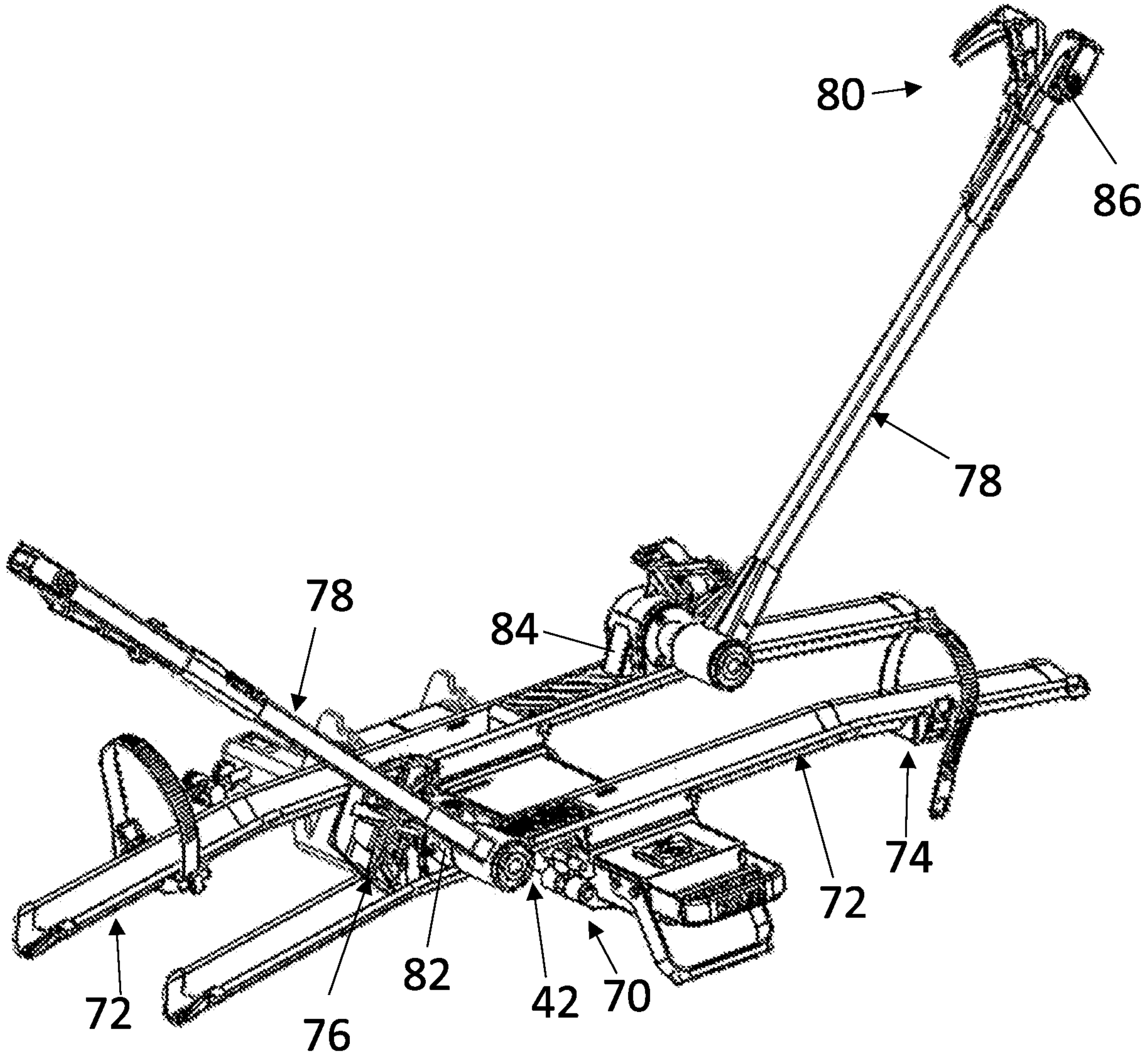
Figure 4C:
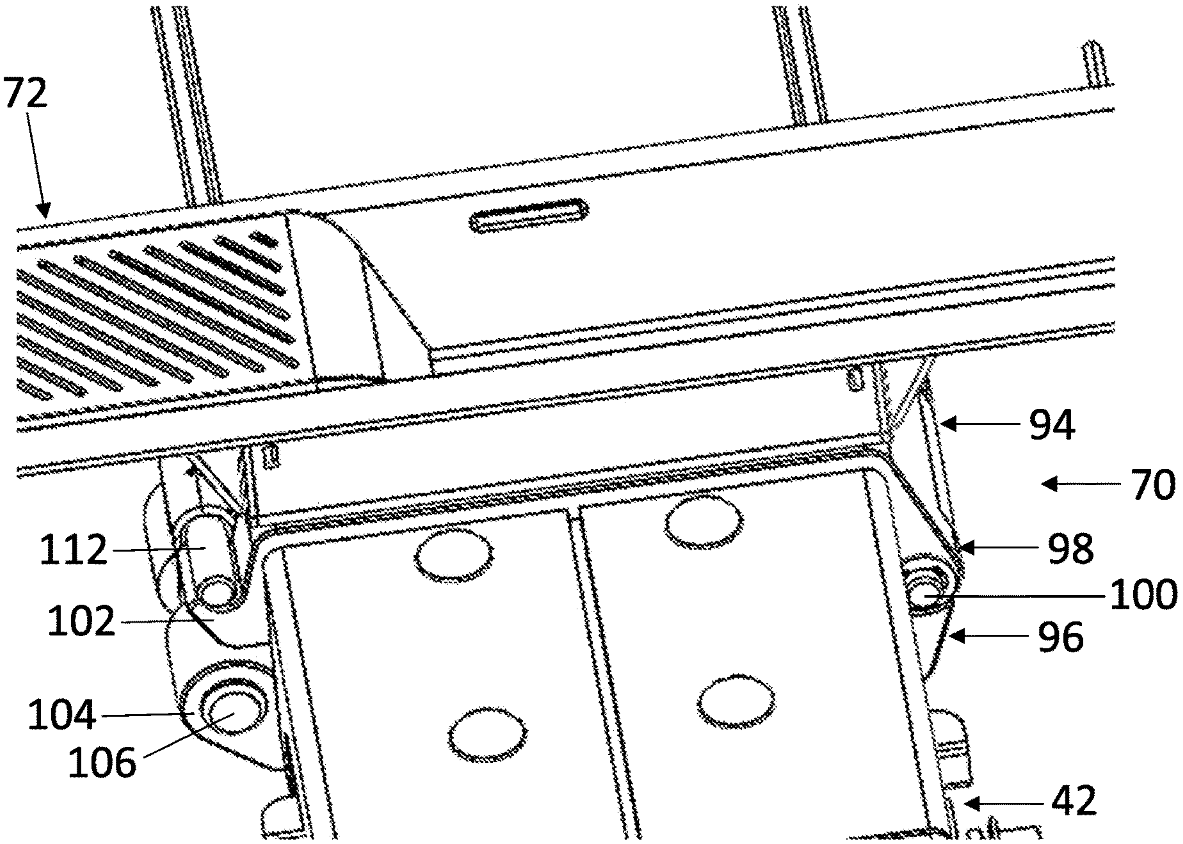

As mentioned above, one or more carrier components or items of equipment, such as a single-arm bicycle carrier module can be mounted to the mounting base via a mounting area. FIGS. 4A-4C display an exemplary single-arm bicycle carrier module and its attachment to a mounting base in accordance with one or more embodiments.

With reference now to FIGS. 4A-4C, each single-arm bicycle carrier module 20 is engaged with one of the mounting areas 18 via a mounting clasp 70, to which a tray 72 is secured. In a manner to be explained in further detail below, the mounting clasp 70 is utilized to secure all of the various carrier components or items of equipment to one of the mounting areas 18 of any of the beams 5, 10, 15.

With continued reference to FIGS. 4A-4C, in one or more embodiments, the tray 72 of each single-arm bicycle carrier module 20 is configured to underlie both wheels of a bicycle. Toward one end, tray 72 can include a ratchet strap assembly 74, which is configured for wrapping about the lower area of one of the bicycle wheels for maintaining it in position, in a manner as is known. Toward the other end, the tray 72 can be provided with an arcuate wheel engagement member 76 and a wheel clamp assembly that includes a pivoting arm 78 and a hook assembly 80. The arm 78 is mounted for pivoting movement on a shaft 82, which extends from a mount 84 secured to the tray 72. The arm 78 is pivotable about shaft 82 for movement between a folded, inoperative position in which the arm 78 is folded downwardly against the tray 72 for transport or storage, and an operative position as illustrated. The arm 78 may include a trigger 86 interconnected with an angular positioning mechanism for fixing the arm 78 in a predetermined angle when in the operative position. The arm 78 is provided with ratchet teeth 88, and the hook assembly 80 is movable along the length of arm 78 so as to be movable toward and away from a bicycle wheel supported from below by tray 72 and engaged with wheel engagement member 76. In one or more embodiments, when hook assembly 80 is moved downwardly on arm 78 against the bicycle wheel, the wheel is clamped between the hook assembly 80 and the wheel engagement member 76. The hook assembly 80 can include a ratchet mechanism having a trigger 90, which can be operated to release engagement with the ratchet teeth 88 of arm 78 so as to enable hook assembly 80 to be moved away from the bicycle wheel.

Figure 5A:
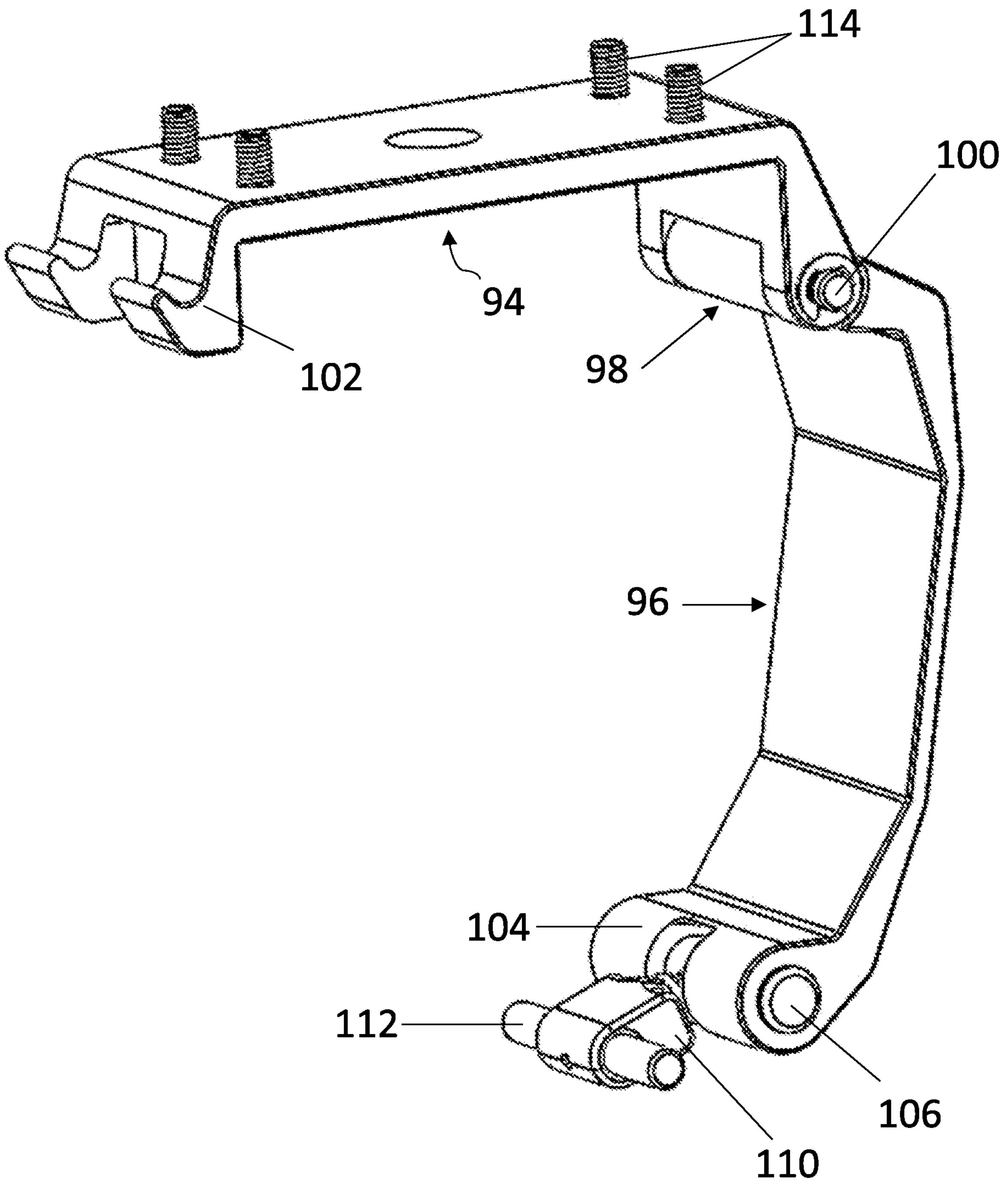
FIGS. 5A-5B display an exemplary mounting clasp in accordance with one or more embodiments.
Figure 5B:
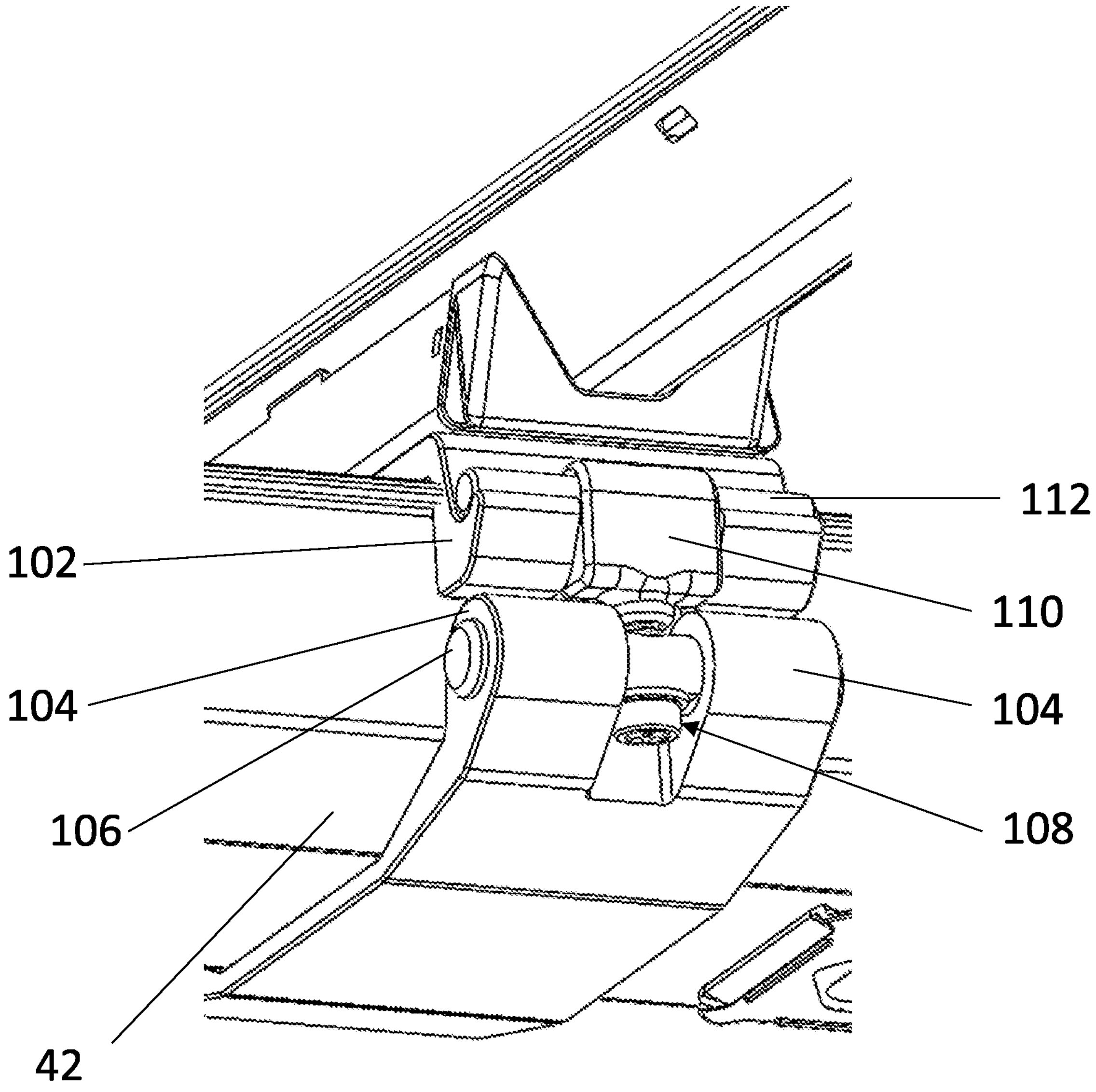

FIG. 4C displays an exemplary attachment of the tray 72 of the single-arm bicycle carrier module 20 to the mounting area of the beam 42 via mounting clasp 70. FIGS. 5A-5B display an exemplary mounting clasp 70 in accordance with one or more embodiments. With reference now to FIGS. 4C and 5A-5B, the mounting clasp 70 includes an upper section 94 and a lower section 96, which are pivotably interconnected at a hinge 98 via a pivot pin 100 for movement between an open position and a closed position. In one or more embodiments, when in the closed position, the upper section 94 and lower section 96 have an inside configuration that matches the external configuration of beam 42, which allows full engagement of the mounting clasp 70 with the underlying surfaces of beam 42. At the end opposite hinge 98, the upper clasp section 94 includes a forked cradle or receiver 102 and the lower clasp section 96 is provided with a pair of spaced apart bosses 104. In one or more embodiments, a shaft 106 extends through aligned passages in bosses 104, and includes a transverse threaded passage through which the threaded shaft of a tightening screw 108 extends. The threaded shaft of the tightening screw 108 is further engaged within a threaded passage provided in a tightening block 110. A tightening shaft 112 extends through a passage in the outer end of tightening block 110. The receiver 102 defines a gap that is sized such that tightening block 110 can be positioned therein, so that the tightening shaft 112 can be positioned against an arcuate engagement surface defined by the receiver 102.

In operation, the mounting clasp 70 is configured so as to be positionable within one of the mounting areas 18, between the ends defined by the lip 54. With the mounting clasp 70 in the open position, the upper section 94 of the mounting clasp 70 is placed onto the top wall of beam 42. The lower section 96 of the mounting clasp 70 is then pivoted about hinge 98 at pivot pin 100, so as to bring lower section 96 into engagement against the lower surfaces of beam 42. In one or more embodiments, tightening screw 108 is loosened an amount sufficient to enable tightening block 110 to move into the gap defined by receiver 102 and to position tightening shaft 112 over the arcuate engagement surfaces defined by receiver 102. The user then employs a suitable driver in engagement with the head of the tightening screw 108 to rotate tightening screw 108 in a tightening direction and draw tightening shaft 112 against the arcuate engagement surfaces of receiver 102. Such rotation of tightening screw 108 continues until mounting clasp 70 is firmly secured to beam 42.

With continued reference to FIGS. 4C and 5A-5B, in one or more embodiments, upper section 94 of mounting clasp 70 may be secured to the tray 72 in any satisfactory manner. In the illustrated embodiment, a series of mounting bolts 114 may extend through the openings in the wall of upper section 94 and into aligned threaded openings in the underside of tray 72. With this construction, if desired, the user may disengage the mounting clasp 70 from the tray 72, rotate the mounting clasp 70 180°, and reattach the mounting clasp 70 to the tray 72 so as to change the side of the hinge 98.

Figure 6A:
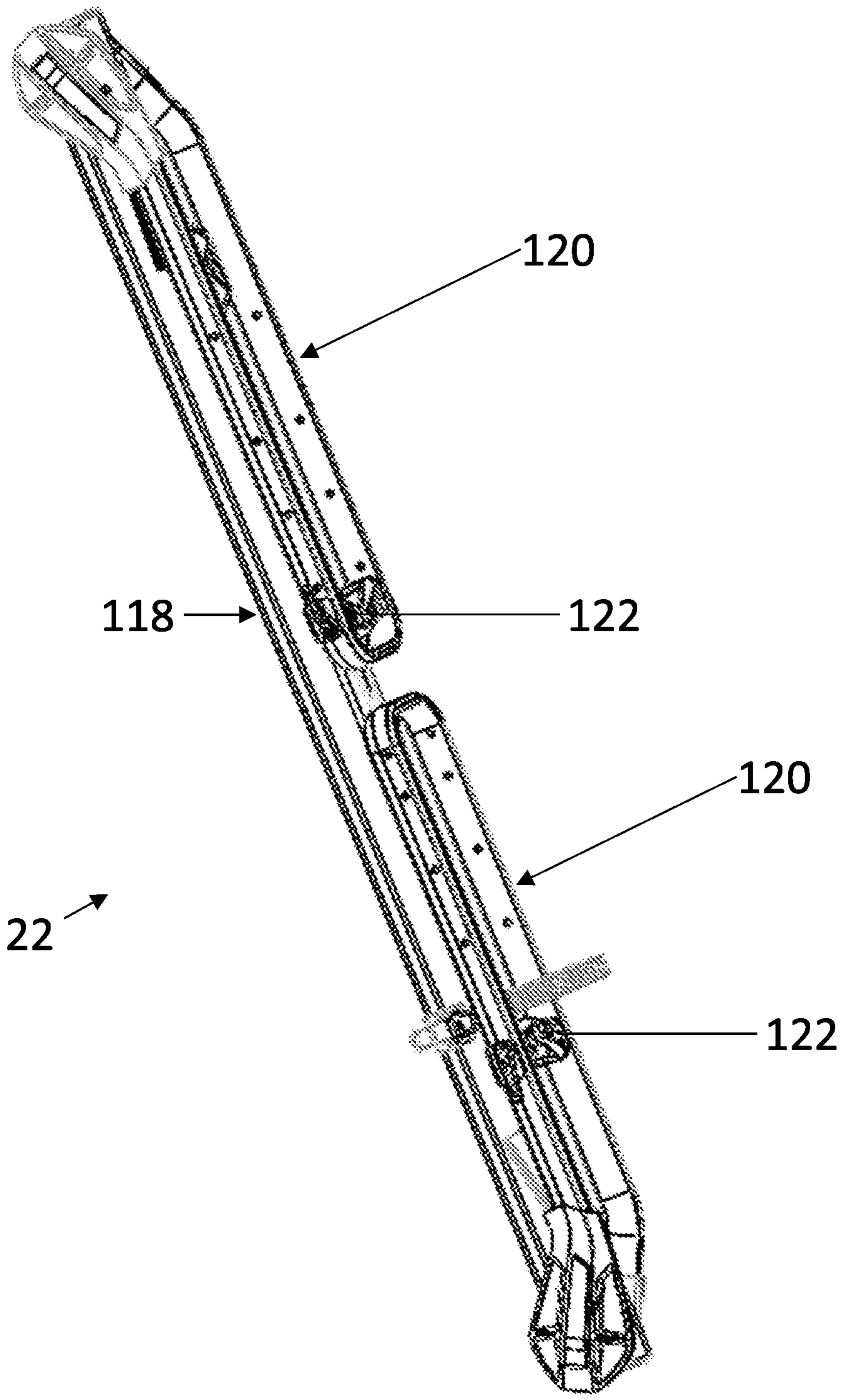
FIGS. 6A-6C display an exemplary double-arm bicycle carrier module in accordance with one or more embodiments.
Figure 6B:
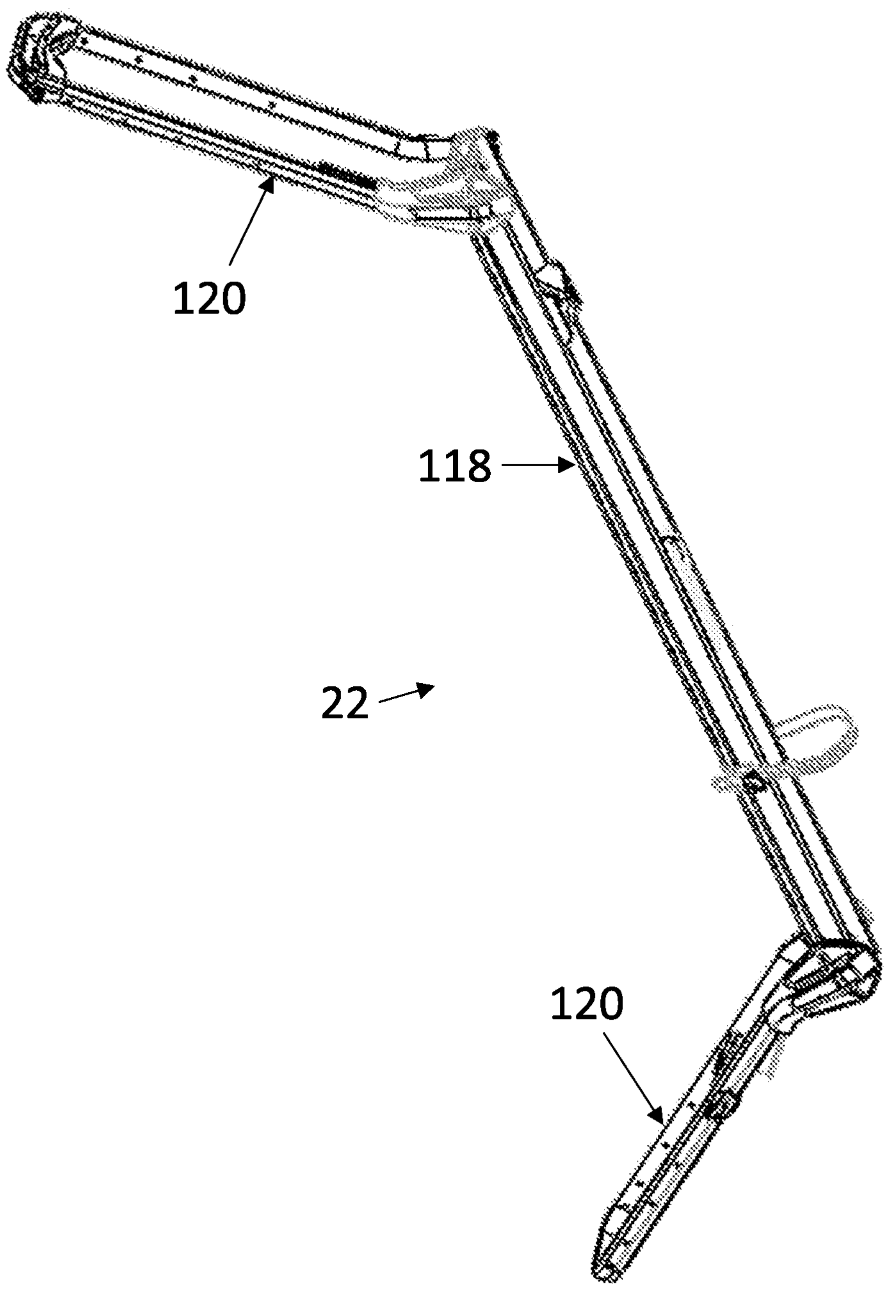
Figure 6C:
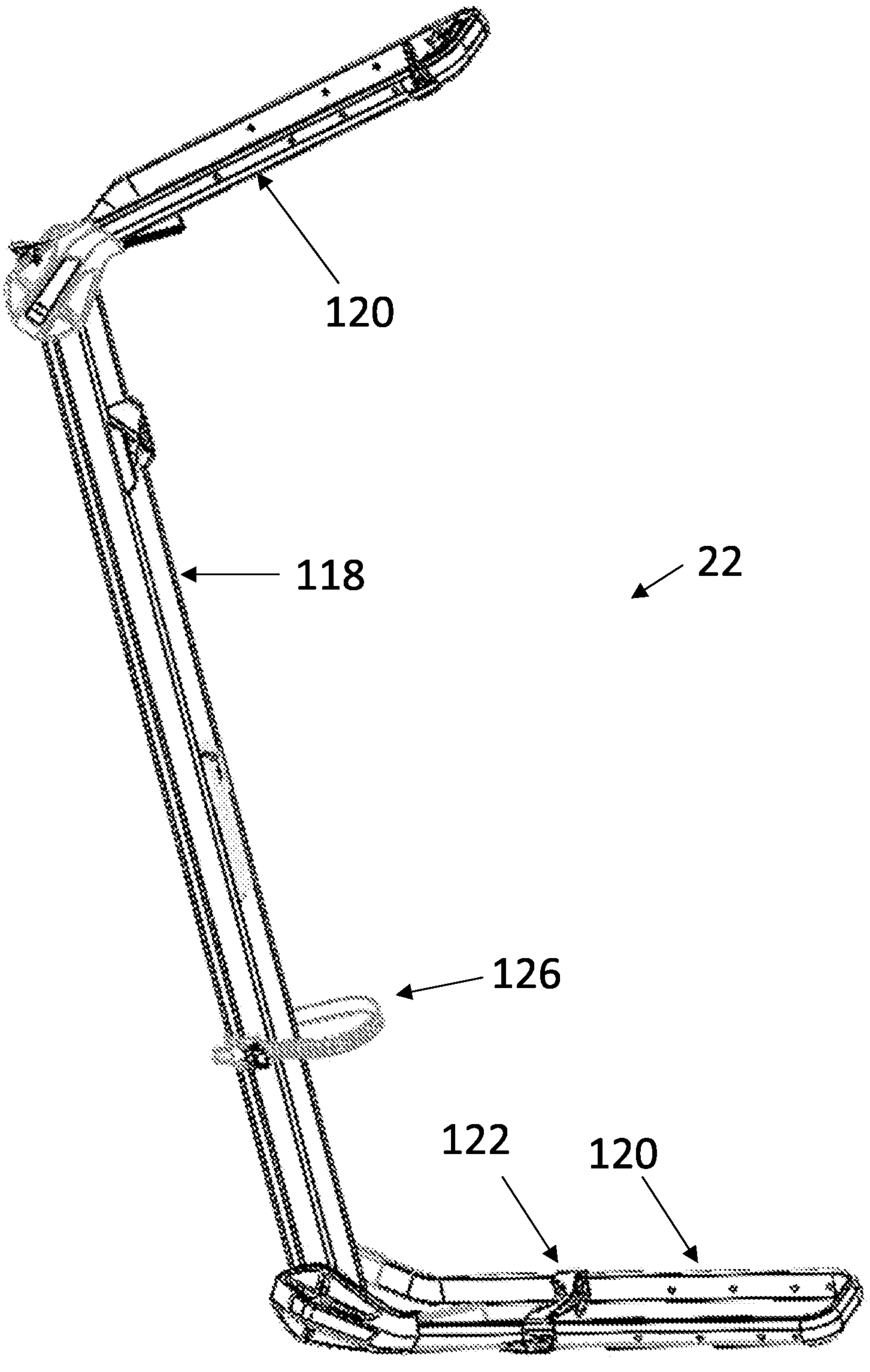

Another carrier component or item of equipment that can be mounted to the mounting base via a mounting area is the double-arm bicycle carrier 22. FIGS. 6A-6C display an exemplary double-arm bicycle carrier module 22 in accordance with one or more embodiments.

With reference now to FIGS. 6A-6C, the double-arm bicycle carrier module 22 includes a tray 118 and a pair of clamping arms 120 pivotably mounted one adjacent each end of tray 118. The tray 118 is configured to underlie the wheels of a bicycle, and the clamping arms 120 can be pivoted between an open position for receiving the bicycle wheels, a clamping position in which the clamping arms 120 are engageable with the bicycle wheels so as to maintain a bicycle in an upright orientation above the tray 118, and a folded position in which the clamping arms are positioned against the tray 118. Each clamping arm 120 may include a variable position wheel engagement member 122 for providing engagement with differently sized bicycle wheels. A ratchet-type mechanism may be provided at the pivot connection between each clamping arm 120 and the tray 118 for maintaining the clamping arms 120 in the desired positions. In at least one embodiment, the tray 118 can include a ratchet strap assembly 126 to secure the bicycle wheels in position on the tray 118.

The double-arm bicycle carrier module 22 is adapted for engagement with the beam 42 via a mounting clasp 70 secured to the underside of tray 118, in the same manner as described above with respect to single-arm bicycle carrier module 20.

In at least one embodiment, a frame-engaging bicycle support system 24 can mounted to the mounting base. FIGS. 7A-7E display an exemplary frame-engaging bicycle support system 24 in accordance with one or more embodiments. With reference to FIGS. 7A-7E, the frame-engaging bicycle support system 24 generally includes one or more trays 124 securable to the beam 42 via a mounting clasp 70 as described previously. The trays 124 are configured to underlie the bicycle wheels, and ratchet strap assemblies 126 are used to secure the bicycle wheels in position on the trays 124. A removable ramp 128 may be employed to assist the user in moving a bicycle onto each tray 124.

The frame-engaging bicycle carrier system 24 can also include a frame-engaging support assembly 130. The support assembly 130 has a base 132 that is configured to be mounted to the reinforced mounting section 50 of beam 42, and a support frame 134 pivotably mounted to base 132, in a manner to be explained. The upper end of the support frame 134 is provided with a suitable number of support arms, corresponding to the number of trays 124. In the illustrated embodiment, a pair of support arms 136*a*, 136*b* are employed, and each is pivotably mounted to the distal end of the support frame 134. A clamp assembly 138 is mounted to the end of each support arm 136*a*, 136*b*, and is employed to selectively engage a frame portion of each bicycle at a location above the tray 124 on which the bicycle is supported.

Figure 7A:
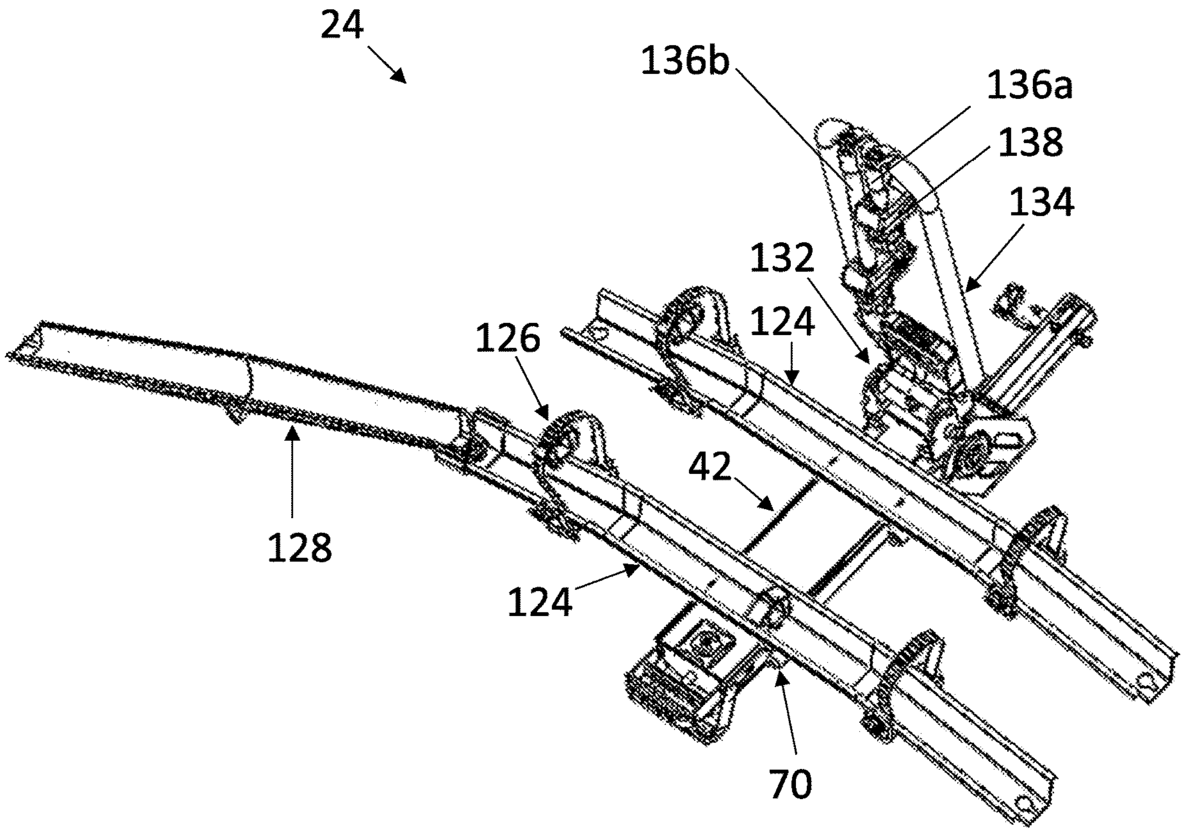
FIGS. 7A-7E display an exemplary frame-engaging bicycle support system in accordance with one or more embodiments.
Figure 7B:
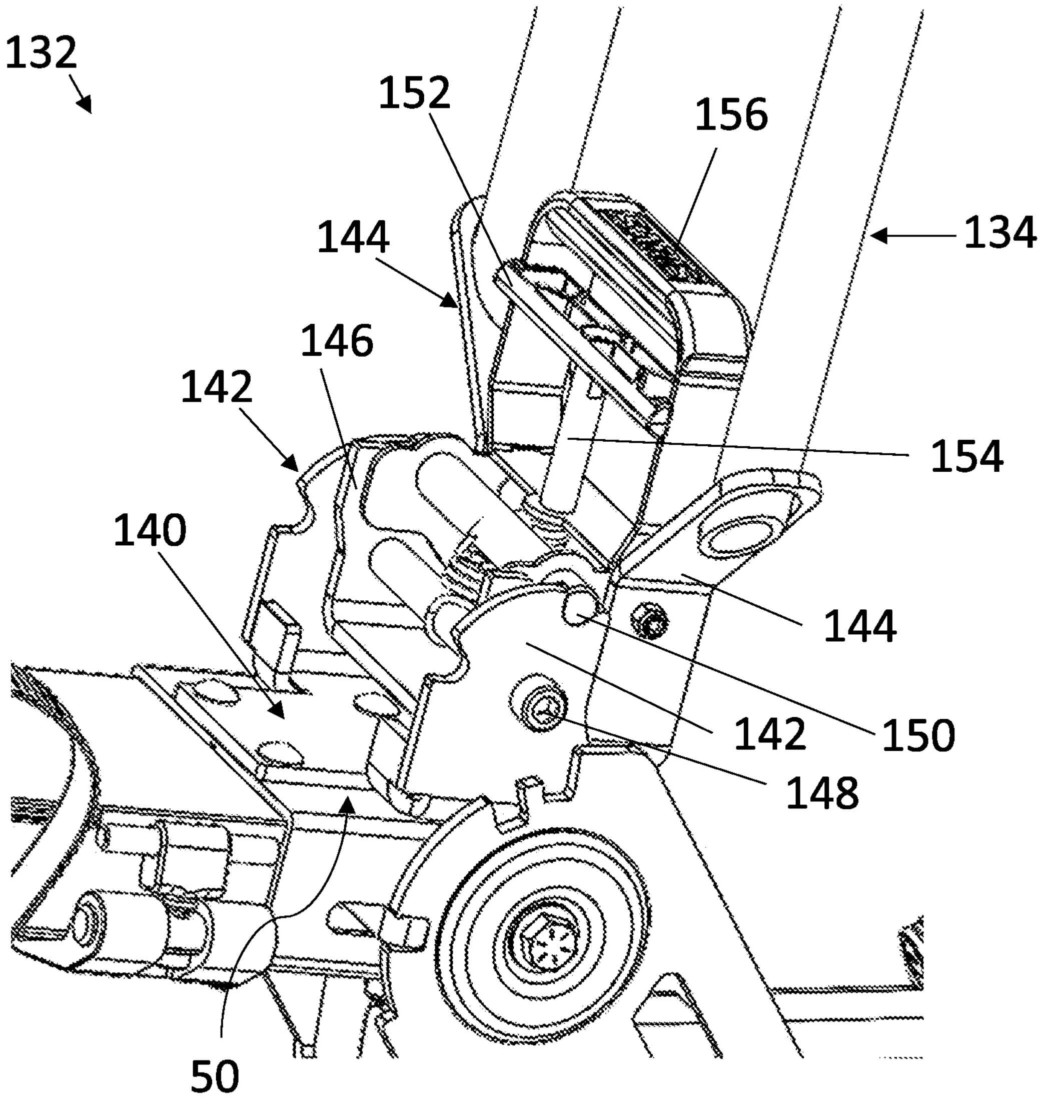
Figure 7C:
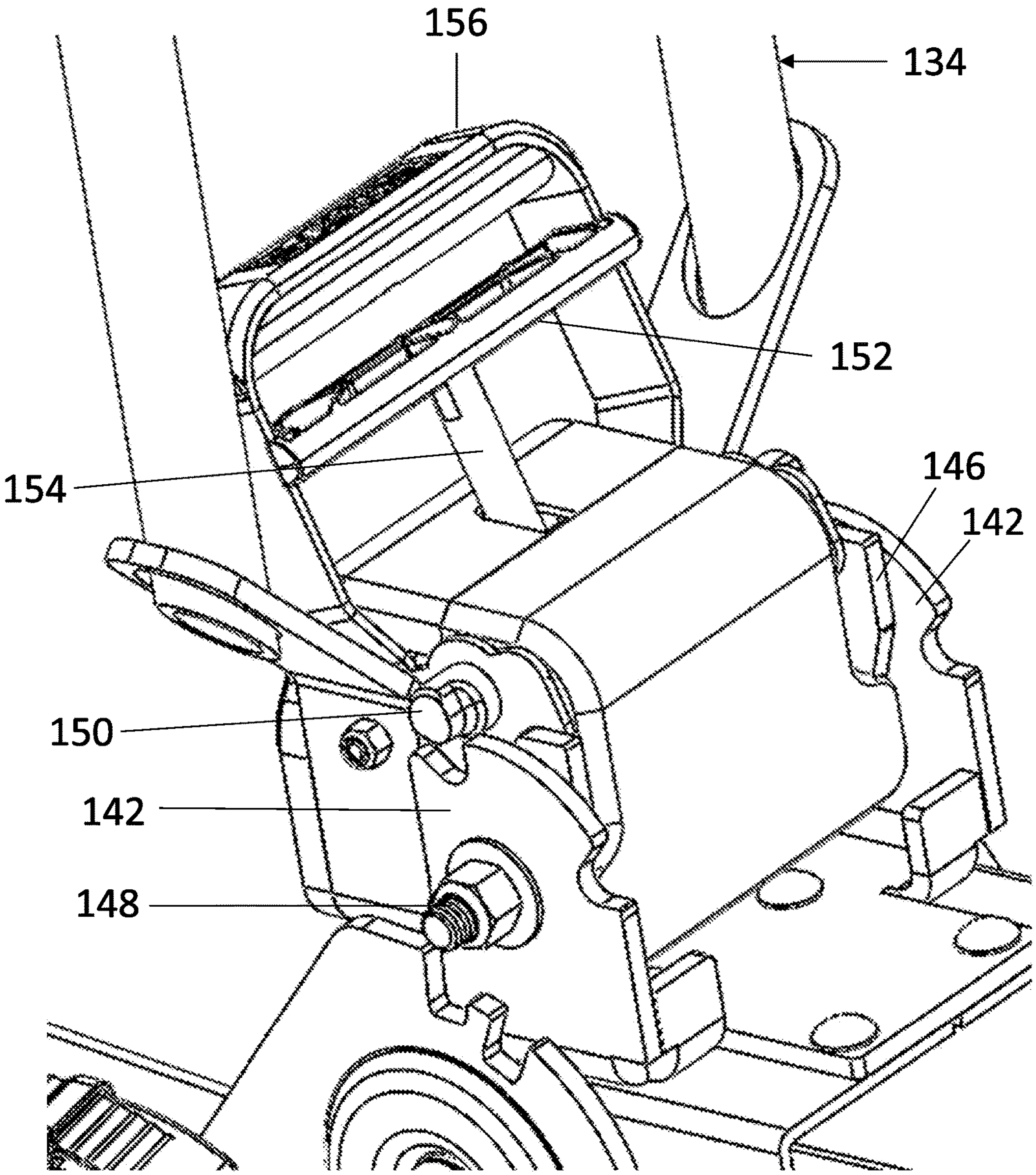
Figure 7D:
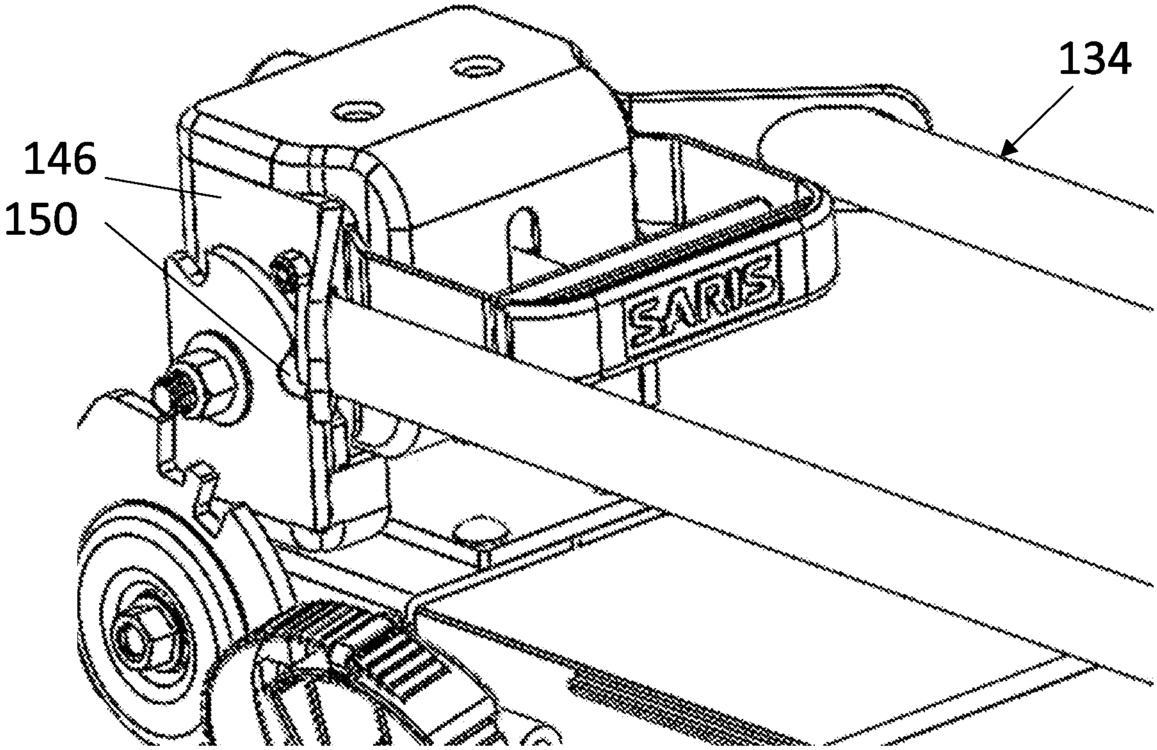
Figure 7E:
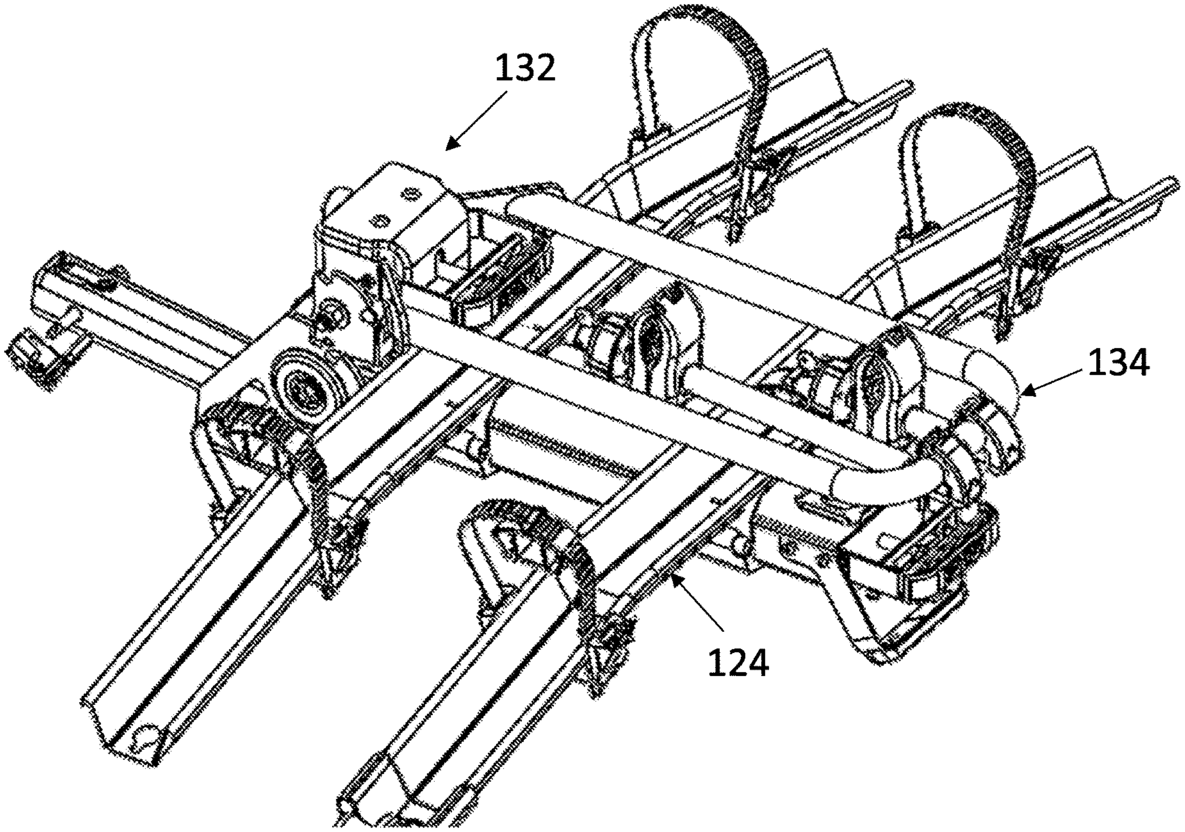

With specific reference to FIGS. 7A-7B, the base 132 of frame-engaging bicycle carrier system 24 includes a mounting plate 140 that is configured to rest on the top wall of reinforced mounting section 50. The mounting plate 140 has a hole pattern that corresponds to that of reinforced mounting section 50, so as to enable mounting plate 140, and thereby base 132, to be secured to reinforced mounting section 50 using mounting bolts that extend through reinforced mounting section 50 and the inner end of beam 42. A pair of notched side brackets 142 extend upwardly from the sides of mounting plate 140.

The lower ends of support frame 134 are secured to mounting brackets 144, which in turn are mounted to a carriage assembly 146 that is pivotably mounted between side brackets 142 via a transverse pivot axle 148. The carriage assembly 146 includes a retainer pin 150 that can be movable between an engaged position and a disengaged position by operation of an actuator 152, which is interconnected with retainer pin 150 via a shaft 154. A handle 156 is mounted to the carriage assembly 146, and defines an open area within which actuator 152 is positioned. With this construction, a user is able to manually grasp the handle 156 and apply pressure to the actuator 152 so as to selectively move the retainer pin 150 between its engaged and disengaged positions. In one or more embodiments, the retainer pin 150 is interconnected with a suitable biasing arrangement, such as a spring incorporated in carriage assembly 146, to bias the retainer pin 150 toward its engaged position. When in the engaged position, the retainer pin 150 functions to engage within the notches of notched side brackets 142 so as to maintain the support frame 134 in either an upright, operative position or a folded, inoperative position. When support frame 134 is in the folded, inoperative position, the beam 142 may be moved to its folded, inoperative position as well.

Figure 7F:
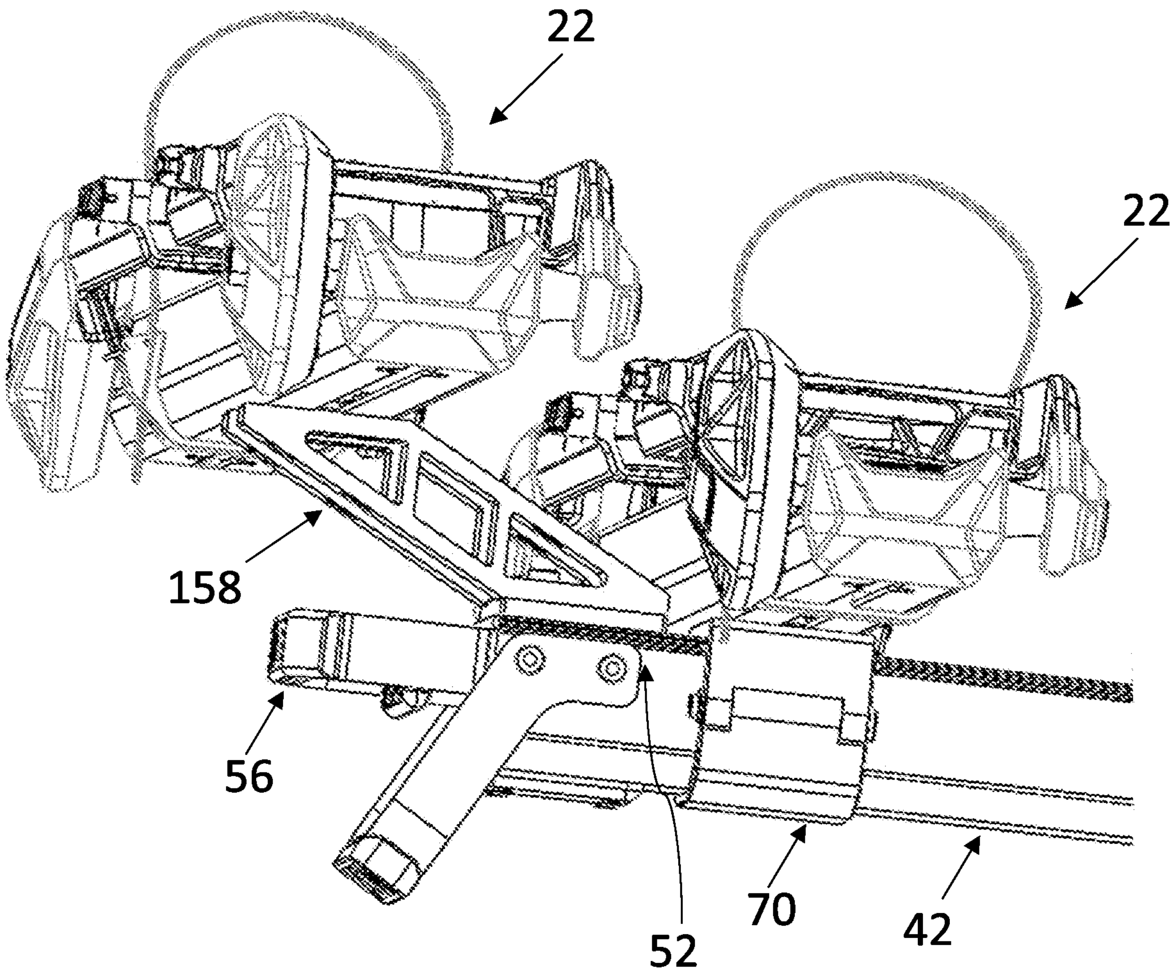
FIGS. 7F-7G display an exemplary add-on bracket assembly and its attachment to an exemplary mounting base in accordance with one or more embodiments.
Figure 7G:
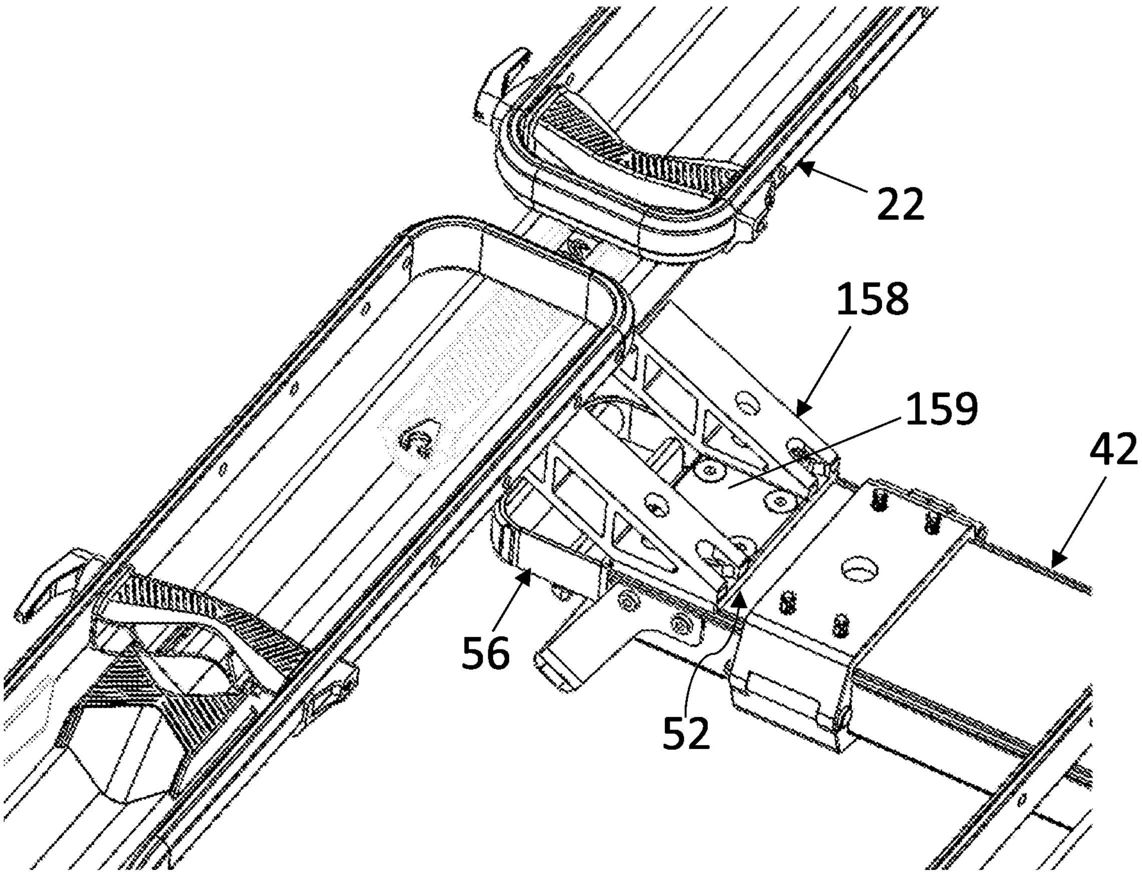

With reference now to FIGS. 7F and 7G, in one or more embodiments, rear mounting area 52 of beam 42 provides an additional space at which a carrier or other item of equipment may be mounted. Representatively, an additional bicycle carrier module, such as a double-arm bicycle carrier module 22, may be engaged with the rear end of the beam 42 at the rear mounting area 52. To accomplish this, the additional bicycle carrier module 22 may be secured to an add-on bracket assembly 158. The add-on bracket assembly 158 includes a mounting plate 159 that is configured for securement to rear mounting area 52 (FIG. 7G). The add-on bracket assembly 158 is configured so as to angle upwardly and rearwardly to position the additional bicycle carrier module 22 rearwardly and above the bicycle carrier module 22 located forwardly thereof. This offset of the supported bicycles will typically make it easier to mount and transport the bicycles. In addition, the upward and rearward configuration of the add-on bracket assembly 158 provides unobstructed access to the handle 56 extending rearwardly from the rear end of the beam 42.

Figure 8A:
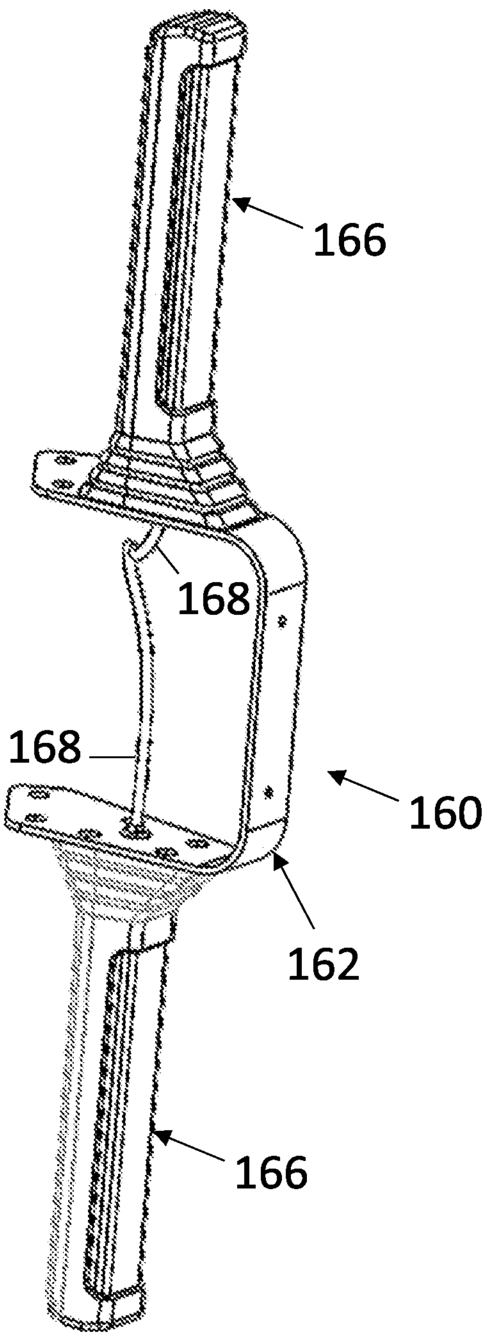
FIGS. 8A-8B display an exemplary lighting module in accordance with one or more embodiments.
Figure 8B:
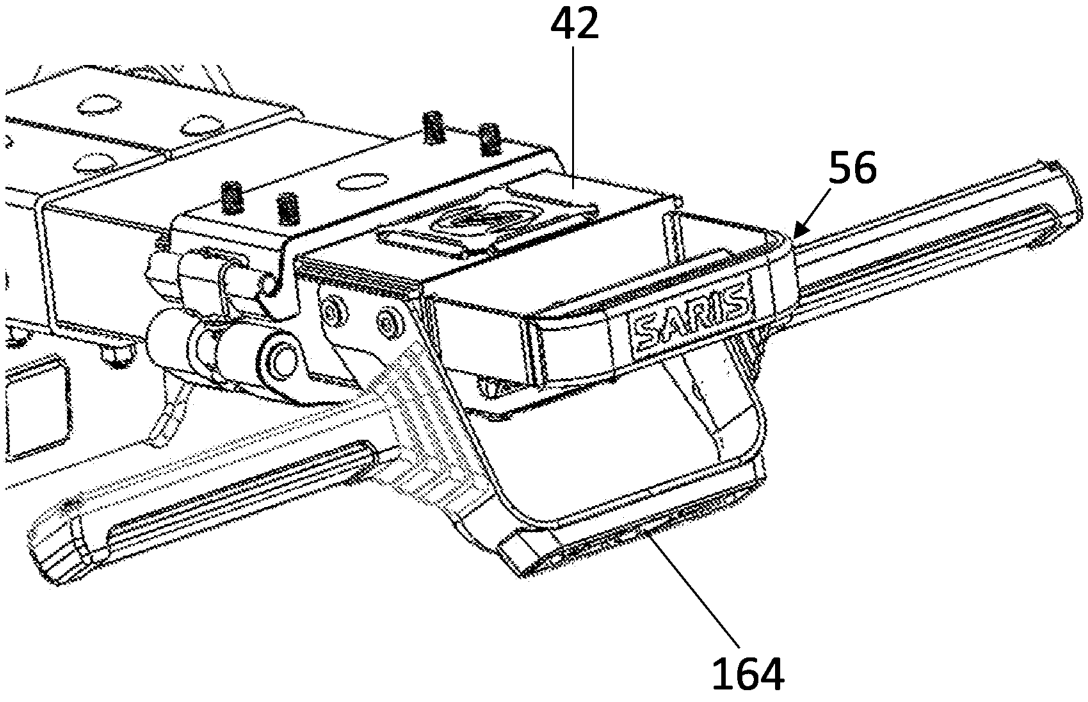

FIGS. 8A-8B display an exemplary lighting module which can be connected to a mounting base in accordance with one or more embodiments. With reference now to FIGS. 8A-8B, a lighting module 160 may be provided for engagement with the beam 42 of the mounting base. In one or more embodiments, the lighting module 160 may replace the bumper 58 (see e.g., FIG. 3A) on the beam 42. The lighting module 160 includes a mounting bracket 162 that may have a shape generally similar to that of the bumper 58, and a resilient resting member 164 may be secured to the end area of mounting bracket 162. A lighting element housing 166 extends outwardly from each side of mounting bracket 162, and contains any satisfactory light-emitting components (such as LEDs) as desired. One or more wires 168 can extend through the sides of the mounting bracket 162 for connection to the light-emitting components. The wires 168 may be fed through a suitable opening in the rear end of beam 42, extending throughout the length of beam 42 for engagement with a suitable vehicle-mounted connector so as to provide power to the light-emitting components contained within the lighting element housings 166. In at least one embodiment, the lighting module does not replace the bumper 58, but rather is integrated into the bumper by being attached to the existing resting member of the bumper 58 (bottom surface of bumper 58), for example.

Referring again to FIG. 2, in one or more embodiments other items or equipment can be configured to mount onto the mounting base via beam 42, such as the open cargo carrier 26, which can be mounted to the beam 42 using one or more of the mounting clasps 70. Open cargo carrier 26 may have any desired construction, and typically is used to support items that are maintained in place using retainer straps, cords or the like. In at least one embodiment, other equipment or carrier components, such as a secure cargo carrier, a kitchen module, and a tent module may also be mounted to the beam 42 using one or more of the mounting clasps 70. In one or more embodiments, the secure cargo carrier can have one or more storage compartments, each of which can be accessed using a lockable door. In one or more embodiments, the kitchen module can have a selectively accessible stove or the like as well as one or more closable storage areas. In one or more embodiments, a tent module can also be adapted to be mounted to the beam 42 using one or more of the storage clasps 70.

Accordingly, the present hitch-mounted carrier system allows for one or more carriers or other items of equipment to be removably attached to the mounting base of the system. The mounting base can vary in size, which different sized bases being configured to accommodate more of fewer items of equipment. The mounting clasp and the add-on bracket assembly allow for secure attachment of the various carriers or equipment to the mounting base of the system.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A hitch-mounted carrier system, comprising:

a single support member configured for engagement with a hitch receiver of a vehicle, and wherein the single support member comprises:

a hitch mounting section that includes a hitch mounting bar configured at a first end to be received within a passage defined by the hitch receiver of the vehicle, a beam pivotably mounted to the hitch mounting section, wherein the beam includes at least one mounting area, a handle and a bumper secured to the rear end of beam, wherein the handle is configured to be grasped by a user for moving the beam between multiple positions, wherein the multiple positions include a lowered tilt position, an operative position, and inoperative, folded positions, and wherein the bumper maintains the rear end of beam above a ground surface when the beam is tilted;

a carrier component configured to carry at least one item, wherein the carrier component is attached to the beam at the at least one mounting area; and at least one mounting clasp comprising an upper section and a lower section configured to connect to each other to enclose the beam within the mounting clasp, wherein the mounting clasp is removably attached to the mounting area and configured for secure attachment of the carrier component to the beam.

2. The hitch-mounted carrier system of claim 1, wherein the hitch mounting section includes a bracket assembly secured to the hitch mounting bar rearwardly of the first end of the hitch mounting bar, wherein the beam includes a front mounting section at a forward end of beam and a rear mounting section at a rear end of beam, and the at least one mounting area is provided between the front mounting section and the rear mounting section, and wherein at a forward end of the front mounting section, the beam is engaged with the bracket assembly, which defines a pivot axis about which the beam is pivotable relative to the hitch mounting section.

3. The hitch-mounted carrier system of claim 2, wherein the bracket assembly includes a pair of notched side bracket members, and wherein the beam is positioned between the side bracket members and engaged with the bracket assembly via a transverse through-bolt.

4. The hitch-mounted carrier system of claim 2, wherein the rear mounting section includes an additional space at which a second carrier component is mounted.

5. The hitch-mounted carrier system of claim 3, wherein the handle includes an actuator member, an actuator rod, and a retainer bar, wherein the actuator member is secured to the rear end of the actuator rod, which extends longitudinally through the interior of beam and is connected at its forward end to the retainer bar, and wherein the retainer bar extends through a pair of slots in side walls of the front mounting section.

6. The hitch-mounted carrier system of claim 5, wherein end portions of the retainer bar extend outwardly from the side walls of the beam and the front mounting section and are configured to be received within the notches defined by the side bracket members.

7. The hitch-mounted carrier system of claim 1, wherein the carrier component is a single-arm bicycle carrier module comprising a tray, wherein the tray is configured to underlie both wheels of a bicycle and is engaged with one of the mounting areas via the mounting clasp.

8. The hitch-mounted carrier system of claim 7, wherein the tray includes, on a first end, a ratchet strap assembly that is configured for wrapping about a lower area of the bicycle wheels for maintaining them in position, and on a second end, an arcuate wheel engagement member and a wheel clamp assembly that includes a pivoting arm and a hook assembly, wherein the wheel of the bicycle is clamped between the hook assembly and the wheel engagement member.

9. The hitch-mounted carrier system of claim 1, wherein the upper section and the lower section are pivotably interconnected at a hinge via a pivot pin for movement between an open position and a closed position.

10. The hitch-mounted carrier system of claim 9, wherein the lower section of the mounting clasp comprises a tightening block at a distal end of the lower section and a tightening shaft at an outer end of the tightening block, wherein the upper section of the mounting clasp comprises a receiver that defines a gap sized for the selective positioning of the tightening block therein, and wherein when the mounting clasp is in the closed position, the tightening block is positioned within the gap and the tightening shaft is positioned against a surface of the receiver, thereby enclosing the beam within the mounting clasp.

11. The hitch-mounted carrier system of claim 10, wherein inner surfaces of the upper section and inner surfaces of the lower section match the corresponding outer surfaces of the beam to enable full engagement of the upper section and the lower section with the beam when the mounting clasp is in the closed position.

12. A hitch-mounted carrier system, comprising:

a single support member configured for engagement with a hitch receiver of a vehicle, and wherein the single support member comprises:

a hitch mounting section that includes a hitch mounting bar configured at a first end to be received within a passage defined by the hitch receiver of the vehicle, a beam pivotably mounted to the hitch mounting section, wherein the beam includes at least two mounting areas, a handle secured to the rear end of beam, wherein the handle is configured to be grasped by a user for moving the beam between multiple positions, wherein the multiple positions of the beam include a lowered tilt position, an operative position, and inoperative, folded positions, a bumper secured to the rear end of the beam, wherein the bumper is configured to maintains the rear end of beam above a ground surface when the beam is tilted; and a carrier component configured to carry at least one item, wherein the carrier component is attached to the beam the at least one mounting area, and at least one mounting clasp comprising an upper section and a lower section configured to connect to each other to enclose the beam within the mounting clasp, wherein the mounting clasp is removably attached to the mounting area and configured for secure attachment of the carrier component to the beam.

13. The hitch-mounted carrier system of claim 12, wherein the bumper comprises a lighting module comprising a light-emitting component, wherein upon activation the lighting module selectively emits light via the light-emitting component.

14. The hitch-mounted carrier system of claim 12, wherein the hitch mounting section includes a bracket assembly secured to the hitch mounting bar rearwardly of the first end of the hitch mounting bar, wherein the beam includes a front mounting section, and wherein at a forward end of the front mounting section, the beam is engaged with the bracket assembly, which defines a pivot axis about which the beam is pivotable relative to hitch mounting section.

15. The hitch-mounted carrier system of claim 12, wherein the upper section and the lower section are pivotably interconnected at a hinge via a pivot pin for movement between an open position and a closed position.

16. The hitch-mounted carrier system of claim 12, wherein the carrier component is a single-arm bicycle carrier module comprising a tray, wherein the tray is configured to underlie both wheels of a bicycle and is engaged with one of the mounting areas via the mounting clasp.

17. The hitch-mounted carrier system of claim 12, wherein the carrier component is a double-arm bicycle carrier module comprising a tray, a pair of clamping arms pivotably mounted at respective ends of the tray, wherein the tray is configured to underlie both wheels of a bicycle and is securable to the beam via the mounting clasp, and the clamping arms are configured to selectively pivot between an upright clamping position and a folded position.

18. The hitch-mounted carrier system of claim 17, wherein each clamping arm further comprises a wheel engagement member positionable along the length of the clamping arm and configured to selectively enable engagement of bicycle wheels of different sizes.

19. The hitch-mounted carrier system of claim 12, wherein the carrier component is a frame-engaging bicycle carrier module comprising:

at least one tray, wherein the at least one tray is configured to underlie the bicycle wheels and is securable to the beam via the mounting clasp;

a support frame assembly comprising a base mounted to a front mounting section of the beam and a support frame pivotably mounted to the base, wherein an upper end of the support frame includes at least one pivotably mounted support arm, wherein the support arm is configured to selectively engage a frame portion of the bicycle.

20. The hitch-mounted carrier system of claim 15, wherein the lower section of the mounting clasp comprises a tightening block at a distal end of the lower section and a tightening shaft at an outer end of the tightening block, wherein the upper section of the mounting clasp comprises a receiver that defines a gap sized for the selective positioning of the tightening block therein, and wherein when the mounting clasp is in the closed position, the tightening block is positioned within the gap and the tightening shaft is positioned against a surface of the receiver, thereby enclosing the beam within the mounting clasp.

* * * * *